United States Patent
Rios et al.

(10) Patent No.: US 8,961,189 B2
(45) Date of Patent: *Feb. 24, 2015

(54) SYSTEM FOR COSMETIC AND THERAPEUTIC TRAINING

(71) Applicant: TruInject Medical Corp., Newport Beach, CA (US)

(72) Inventors: Gabrielle A. Rios, Newport Beach, CA (US); Jeff Crockett, Fullerton, CA (US); Clark B. Foster, Mission Viejo, CA (US); David J. Mishelevich, Playa del Rey, CA (US); Milan Trcka, North Tustin, CA (US); Aaron J. Gifford, Lake Elsinore, CA (US); Chris C. Ludolph, Lake Forest, CA (US)

(73) Assignee: TruInject Medical Corp., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,368

(22) Filed: Jun. 27, 2014

(65) Prior Publication Data

US 2014/0315165 A1 Oct. 23, 2014

Related U.S. Application Data

(63) Continuation of application No. 14/067,829, filed on Oct. 30, 2013, now Pat. No. 8,764,449.

(60) Provisional application No. 61/720,046, filed on Oct. 30, 2012, provisional application No. 61/784,239, filed on Mar. 14, 2013, provisional application No. 61/814,766, filed on Apr. 22, 2013, provisional application No. 61/826,899, filed on May 23, 2013.

(51) Int. Cl.
G09B 23/28 (2006.01)
G09B 23/30 (2006.01)

(52) U.S. Cl.
CPC .............. *G09B 23/30* (2013.01); *G09B 23/285* (2013.01)
USPC ........................................... 434/262; 434/219

(58) Field of Classification Search
USPC .................................................... 434/219, 365
See application file for complete search history.

(56) References Cited

U.S. PATENT DOCUMENTS

| 5,518,407 A | 5/1996 | Greenfield | |
|---|---|---|---|
| 5,899,692 A * | 5/1999 | Davis et al. | 433/80 |

(Continued)

FOREIGN PATENT DOCUMENTS

| CN | 102708745 A | 10/2012 |
|---|---|---|
| EP | 1884211 A2 | 2/2008 |

(Continued)

OTHER PUBLICATIONS

Desjardins, et al. "Epidural needle with embedded optical fibers for spectroscopic differentiation of tissue: ex vivo feasibility study", Biomedical Optics Express, vol. 2(6): pp. 1-10, Jun. 2011.

(Continued)

*Primary Examiner* — Robert J Utama
(74) *Attorney, Agent, or Firm* — Knobbe, Martens, Olson & Bear LLP

(57) ABSTRACT

Systems and methods are disclosed for an apparatus and method for practicing injection techniques through an injectable apparatus. The injectable apparatus may contain a camera that is configured to detect the intensity and color of light attenuated from a testing tool after it is injected into a simulated human or animal body parts. A training tool may be connected to a user display device to generate a display of the injection apparatus as well as the performance parameters of a trainee.

25 Claims, 32 Drawing Sheets

(56) References Cited

U.S. PATENT DOCUMENTS

| | | |
|---|---|---|
| 6,485,308 B1 | 11/2002 | Goldstein |
| 6,575,757 B1 | 6/2003 | Leight et al. |
| 6,769,286 B2 | 8/2004 | Biermann et al. |
| 7,553,159 B1 | 6/2009 | Arnal et al. |
| 7,594,815 B2 | 9/2009 | Toly |
| 7,665,995 B2 | 2/2010 | Toly |
| 7,857,626 B2 | 12/2010 | Toly |
| 8,007,281 B2 | 8/2011 | Toly |
| 8,257,250 B2 | 9/2012 | Tenger et al. |
| 8,342,853 B2 | 1/2013 | Cohen |
| 8,382,485 B2 | 2/2013 | Bardsley |
| 8,467,855 B2 | 6/2013 | Yasui |
| 8,535,062 B2 | 9/2013 | Nguyen |
| 8,764,449 B2 | 7/2014 | Rios et al. |
| 2003/0114842 A1 | 6/2003 | DiStefano |
| 2005/0084833 A1 | 4/2005 | Lacey et al. |
| 2006/0084050 A1* | 4/2006 | Haluck .................... 434/365 |
| 2006/0194180 A1* | 8/2006 | Bevirt et al. ................. 434/262 |
| 2007/0003917 A1 | 1/2007 | Kitching et al. |
| 2008/0097378 A1* | 4/2008 | Zuckerman ................... 604/506 |
| 2008/0138781 A1 | 6/2008 | Pellegrin et al. |
| 2009/0208915 A1 | 8/2009 | Pugh |
| 2009/0263775 A1 | 10/2009 | Ullrich |
| 2009/0326556 A1 | 12/2009 | Diolaiti |
| 2010/0099066 A1 | 4/2010 | Mire et al. |
| 2010/0120006 A1 | 5/2010 | Bell |
| 2010/0167249 A1 | 7/2010 | Ryan |
| 2010/0167254 A1 | 7/2010 | Nguyen |
| 2011/0027767 A1 | 2/2011 | Divinagracia |
| 2011/0207102 A1 | 8/2011 | Trotta et al. |
| 2011/0236866 A1 | 9/2011 | Psaltis et al. |
| 2011/0269109 A2 | 11/2011 | Miyazaki |
| 2011/0294103 A1 | 12/2011 | Segal et al. |
| 2012/0034587 A1 | 2/2012 | Toly |
| 2012/0148994 A1 | 6/2012 | Hori et al. |
| 2012/0171652 A1 | 7/2012 | Sparks et al. |
| 2012/0219937 A1 | 8/2012 | Hughes |
| 2012/0251987 A1* | 10/2012 | Huang et al. .................. 434/219 |
| 2012/0280988 A1* | 11/2012 | Lampotang et al. .......... 345/419 |
| 2012/0282583 A1 | 11/2012 | Thaler et al. |
| 2013/0198625 A1 | 8/2013 | Anderson |
| 2013/0203032 A1 | 8/2013 | Bardsley |
| 2013/0323700 A1 | 12/2013 | Samosky |
| 2014/0212864 A1 | 7/2014 | Rios et al. |

FOREIGN PATENT DOCUMENTS

| | | |
|---|---|---|
| GB | 2309644 A | 8/1997 |
| GB | 2508510 | 6/2014 |
| WO | WO 02/083003 A1 | 10/2002 |
| WO | WO 2005/083653 | 9/2005 |
| WO | WO 2007/109540 A2 | 9/2007 |
| WO | WO 2011/136778 | 11/2011 |
| WO | WO 2012/075166 | 6/2012 |
| WO | WO 2012/101286 | 8/2012 |
| WO | WO 2012/106706 | 8/2012 |

OTHER PUBLICATIONS

Inition. Virtual Botox: Haptic App Simulated Injecting the Real Thing. Retrieved from http://inition.co.uk/case-study/virtual-botox-haptic-app-simulates-injecting-real-thing.

Sutherland, et al. "An Augmented Reality Haptic Training Simulator for Spinal Needle Procedures," IEEE, 2011.

Search Report and Written Opinion for Appl. No. PCT/US2013/067352 dated Mar. 31, 2014 in 10 pages.

Search and Examination Report for Appl. No. GB1319193.7 in 6 pages dated Mar. 28, 2014.

* cited by examiner

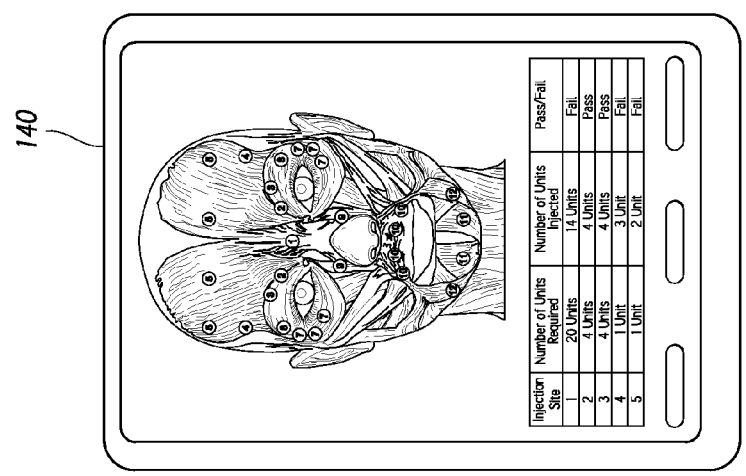
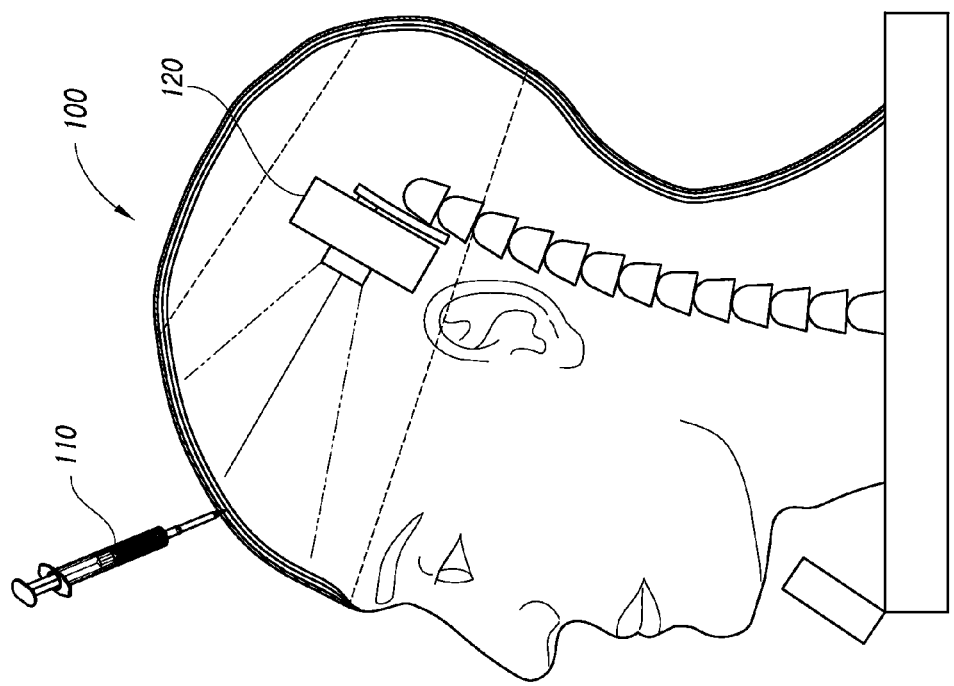
FIG. 1

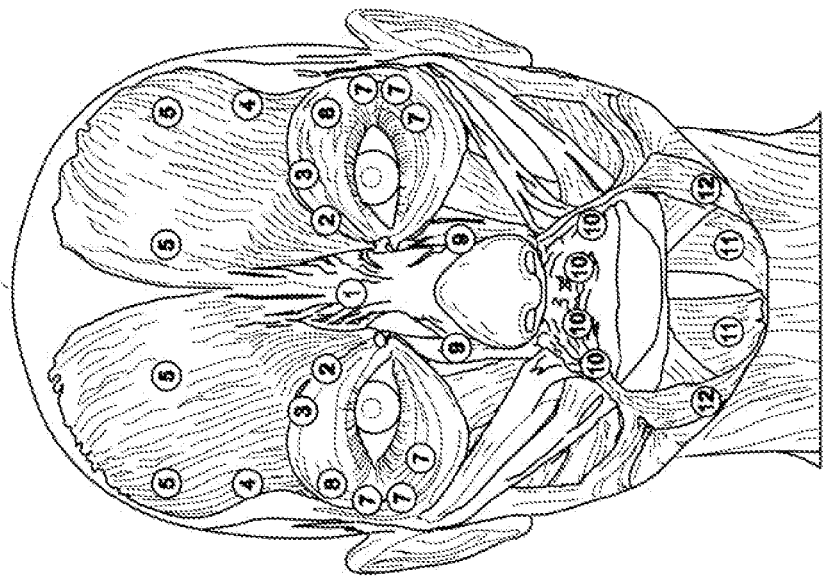

FIG. 11

| | | | |
|---|---|---|---|
| 1 | Procerus | 20 units each sensor | Measure eyebrow to inside of eye Inject mid pupillary |
| 2 | Corrugator | 4 units each sensor | In belly of corrugator, 1cm above brow bone, syringe should be all the way in |
| 3 | Corrugator | 4 units each sensor | In belly of corrugator, 1cm above brow bone, syringe should be all the way in |
| 4 | Frontalis | 1 unit each sensor | To prevent spock look |
| 5 | Frontalis | 1 unit each sensor | Inject in upper third of forehead |
| 7 | Orbicularis Oculi | 4 units in center sensor & 2 units in outer/inner sensor | |
| 8 | Orbicularis Oculi | 2 units each sensors | Brow Lift. Inject in outer campus of eye and go towards the tail of brow |
| 9 | Nasalis | 2-3 units each sensor | On outer side of nasalis, if hit the bone they will need to pull back as they are in the wrong place |
| 10 | Orbicularis | 1 unit each sensor | After pucker and vertical lines are seen, Injector needs to grab while in pucker, on side of the mouth. Grab lip border and stick tip barely into it. |
| 11 | Mentalis | 3 units each sensor | Prevents chin dents |
| 12 | Depressor Anguli Oris | 2 units each sensor | Lifts the corners of the mouth |

SYSTEM FOR COSMETIC AND THERAPEUTIC TRAINING

CROSS-REFERENCE TO RELATED APPLICATIONS

This application is a continuation of U.S. patent application Ser. No. 14/067,829, filed Oct. 30, 2013, which claims the benefit of U.S. Provisional Applications Nos. 61/720,046, filed on Oct. 30, 2012; 61/784,239, filed on Mar. 14, 2013; 61/814,766, filed on Apr. 22, 2013; and 61/826,899, filed on May 23, 2013, the entirety of which are hereby incorporated herein by reference. Furthermore, any and all priority claims identified in the Application Data Sheet, or any correction thereto, are hereby incorporated by reference under 37 C.F.R. §1.57.

BACKGROUND

A variety of medical injection procedures are often performed in prophylactic, curative, therapeutic, or cosmetic treatments. Injections may be administered in various locations on the body, such as under the conjunctiva, into arteries, bone marrow, the spine, the sternum, the pleural space of the chest region, the peritoneal cavity, joint spaces, and internal organs. Injections can also be helpful in administering medication directly into anatomic locations that are generating pain. These injections may be administered intravenously (through the vein), intramuscularly (into the muscle), intradermally (beneath the skin), subcutaneously (into the fatty layer of skin) or intraperitoneal injections (into the body cavity). Injections can be performed on humans as well as animals. The methods of administering injections typically range for different procedures and may depend on the substance being injected, needle size, or area of injection.

Injections are not limited to treating medical conditions, but may be expanded to treating aesthetic imperfections or restorative cosmetic procedures. Many of these procedures are performed through injections of various products into different parts of the body. The aesthetics and therapeutic industry consists of two main categories of injectable products: neuromodulators and dermal fillers. The neuromodulator industry commonly utilizes nerve-inhibiting products such as Botox®, Dysport®, and Xeomin®. The dermal filler industry utilizes products administered by providers to patients for both cosmetic and therapeutic reasons, such as, for example, Juvederm®, Restylane®, Belotero®, Sculptra®, Artefill®, and others. These providers or injectors may include plastic surgeons, facial plastic surgeons, oculoplastic surgeons, dermatologists, nurse practitioners, dentists and nurses.

SUMMARY

One of the major problems in the administration of injections is that there is no official certification or training process. Anyone with a minimal medical related license may inject a patient. These "injectors" may include primary care physicians, dentists, veterinarians, nurse practitioners, nurses, physician's assistants, or aesthetic spa physicians. However, the qualifications and training requirements for injectors vary by country, state, and county. For example, in most states in the United States, the only requirement to inject patients with neuromodulators and/or fillers is a nursing degree or medical degree. This causes major problems with uniformity and expertise in administering injections. The drawbacks with lack of uniformity in training and expertise are widespread throughout the medical industry. Doctors and practitioners often are not well trained in administering injections for diagnostic, therapeutic, and cosmetic chemical substances. This lack of training often leads to instances of chronic pain, headaches, bruising, swelling, or bleeding in patients.

Current injection training options are classroom based, with hands-on training performed on live models. The availability of models is limited. Moreover, even when available, live models are limited in the number and type of injections that may be performed on them. The need for live models is restrictive because injectors are unable to be exposed to a wide and diverse range of situations in which to practice. For example, it may be difficult to find live models with different skin tones or densities. This makes the training process less effective because patients often have diverse anatomical features as well as varying prophylactic, curative, therapeutic, or cosmetic needs. Live models are also restrictive because injectors are unable to practice injection methods on internal organs due to health considerations. As a result of these limited training scenarios, individuals seeking treatments involving injections have a much higher risk of being treated by an inexperienced injector. This may result in low patient satisfaction with the results or failed procedures. In many instances, patients have experienced lumpiness from incorrect dermal filler injections. Some failed procedures may result in irreversible problems and permanent damage to a patient's body. For example, patients have experienced vision loss, direct injury to the globe of the eye, and brain infarctions where injectors have incorrectly performed dermal filler procedures. Other examples of side effects include inflammatory granuloma, skin necrosis, endophthalmitis, injectable-related vascular compromise, cellulitis, biofilm, subcutaneous nodules, fibrotic nodules, and other infections.

As a result of the varying qualifications and training requirements for injectors, there is currently no standard to train, educate, and certify providers on the proper and accurate process of various injection techniques. Patients seeking injections also have few resources for determining the qualifications or experience of a care practitioner.

The present disclosure generally relates to an injection apparatus and training system for prophylactic, curative, therapeutic, acupuncture, or cosmetic injection training and certification. The training system eliminates the need to find live models for hands-on training sessions. The training system provides feedback on trainees and the accuracy of injection procedures performed. In an embodiment, feedback is provided in real time. The training system can be used as a measurement on how the "trainee" is doing prior to receiving actual product by the manufacturing company as a measure of qualification. The training system reduces the risks associated with inexperienced and uncertified medical personnel performing injection procedures.

The training system can be used to educate, train, and certify medical personnel for injection procedures. It can also be utilized as a testing program for certifying medical personnel. The system will enable users to practice a variety of injections, ranging from on label to off label product injections. In some embodiments, the system may allow users to train for therapeutic treatments. In other embodiments, the system may allow users to train for injections into arteries, bone marrow, the spine, the sternum, the pleural space of the chest region, the peritoneal cavity, joint spaces, internal organs, or any other injection sites. The system may be used for any type of injection, including, but not limited to those involving prophylactic, curative, therapeutic, or cosmetic treatments in both humans and animals. In other applications, the systems disclosed herein can be used for dental application and training for dental procedures.

In one embodiment, there are three main components of the training system: (1) a training apparatus (also referred to interchangeable as an injection apparatus throughout the present disclosure) which features an anatomically accurate model of a human or human body part necessary for injection training, (2) a camera associated with the training apparatus, and (3) a testing tool with light emitting capabilities. In an embodiment, a fourth component of the training system can include a output device that can run an application which receives communications from the training apparatus or camera and generates information regarding injection parameters based on the communications from the injection apparatus or camera. In an embodiment, the images captured by the camera are processed by a processor included either in the injection apparatus or in the camera before being communicated to the output device. This processing can include, for example, determining an indication of one or more injection parameters. In an embodiment, the anatomical model can include various injection conditions, such as, for example, layered skin, available in multiple tones and textures to mimic a diverse span of age, race, and skin texture. In an embodiment, the layered skin can be removable and/or replaceable. The apparatus can simulate any human or animal part, such as, for example, the face, head, brain, neck, back, chest, spine, torso, arms, legs, hands, feet, mouth, or any other body part or portion of the body of interest. In an embodiment, the testing tool can be, for example a syringe or hypodermic needle. In an embodiment, the injection apparatus is reusable. In an embodiment, the injection apparatus is disposable.

Although the present disclosure specifically describes the use of a camera, it is to be understood that the principles disclosed throughout the present disclosure can apply to any light detector or light detection device. Moreover, by referring to a camera, the present disclosure is not limited to a visible light detection device, rather, any visible or non-visible light detector or detection device can be used as would be understood by a person of skill in the art with any embodiment disclosed herein.

In one embodiment, the injection apparatus can feature an anatomically correct model of an animal or animal body part. The animal or animal body part can have a base layer that can be covered in removable skin, animal hair, or scales to replicate the look and feel of a real animal. The skin, animal hair, or scales can be in different colors, coarseness, thickness, density, or stiffness.

In some embodiments, the base layer of the apparatus may be a clear plastic shell simulating a human or animal body part, such as, for example, a human or animal head. The plastic shell can be covered with layers of elastomer membranes simulating human or animal muscle or skin. In an embodiment, one or more of these layers can be removable and/or replaceable. In some embodiments, the top layer of injectable skin consists of separate layers simulating mammalian skin: the epidermis, dermis, and hypodermis. The layers of injectable muscle and skin may be of uniform density. In other embodiments, the layers of skin may be thicker or thinner to simulate the skin of humans or animals with uneven skin layers or damaged skin. The separate layers of injectable skin may consist of elastomers simulating the look and feel of human or animal skin and muscle. The injectable muscle and skin layers may have a different transparency. For example, the different layers may be opaque, tinted, or clear.

In one embodiment, the injection apparatus may be used for injections in different areas of the human or animal body. For example, the injection apparatus may simulate the rear torso and buttocks of a human for epidural injections. The injection apparatus can also simulate the back of the neck of an animal for subcutaneous injections. The injection apparatus may also simulate different organs of the human or body, such as the heart, brain, or liver. In some embodiments, the injection apparatus can simulate different bones in human or animal bodies that require injections or extractions. The simulated bones can contain extractable material that simulates bone marrow. The bones can be separately used as a training apparatus or be placed within an anatomically correct model of a simulated human or animal body part. For example, bone marrow extractions can be performed by inserting the testing tool through skin, muscle, and bone layers of a training apparatus. In one embodiment, the injection apparatus may be covered in different removable layers of material for detecting an injection. The different layers may be opaque, tinted, marked or clear. In some embodiments, the different removable layers of the injection apparatus may be embedded with sensors that can be pierced by a testing tool. In an embodiment, the apparatus is a human or animal mouth that can be used to perform dental or periodontic procedures.

In one embodiment, a testing tool is provided. In an embodiment, the testing tool is in the form of a hypodermic needle. The hypodermic needle can be part of a syringe. The hypodermic needle can be of any gauge. The testing tool can be of any size or shape and designed to simulate the size and shape of an injection tool, such as a syringe, used for any particular type of injection being practiced. In an embodiment, the testing tool has a light source that emits light at the head of the needle. In an embodiment, a fiber optic is in the needle. For example, the fiber optic can be inserted into or threaded through the needle and configured to emit light from a light source through the tip or head of the needle. The light source may be one or more an LEDs, laser diodes, or any other light emitting device or combination of devices. In an embodiment, the light source can emit light along a spectrum of visible. In other embodiments, the light source can emit light of non-visible light, such as infrared light. In some embodiments, the light emitted from the light source is attenuated by each layer of simulated skin or muscle. The testing tool can have a barrel. The testing tool can also have a plunger associated with the barrel.

The testing tool can be used to practice injections on the injection apparatus. In an embodiment, the light emitted through the tip or head of the needle of the testing tool is attenuated by the injection apparatus. The attenuated light is detected by the camera. As the needle portion of the testing tool penetrates through each layer of the injection apparatus material, different colors, intensities, fluorescence, textures, graph lines, polarization, or other visual effects of light will be detected by the camera (or any other visible or non-visible light detector). The resulting visual effects of the attenuated light are detected or viewed by the camera. The visual effects can represent the differences in location of the injection, depth of the injection, pressure of an injection exerted by the user and/or angle of injection. This information, detected by the camera, can be communicated to an output device for data collection, testing or certification purposes. Although the disclosure discloses the use of a camera, the disclosure and claims are not limited to the use of a visible light camera, or typical consumer photography cameras. Rather, the term camera, as used herein, can, in some embodiments, extend to the use of any light detectors or light detection devices, including, for example, photodiodes, infrared, polarization, fluorescent or ultraviolet light or thermal imaging cameras or other devices used to detect the presence or absence of visible or non-visible light.

In some embodiments, a camera is placed within or proximate to the injection apparatus. The camera can send the information detected to a processing unit. The processing unit communicates with an output device which can display the results received from an injection. The output device, also interchangeably referred to herein as an interface device, user device or display device, can include any type of display useful to a user, such as, for example, a tablet, phone, laptop or desktop computer, television, projector or any other electronic or paper based display technology. The processing unit can also collect the information for use in data gathering or informatics. Information about the injection can also be gathered from the testing tool. The output device may include lights, graphical displays, audio devices, or user controls. The output device can be an electronic, computer, or mobile device. This can include, for example, a smart phone or tablet. The output device can run a dedicated application configured to receive wireless communication directly from the camera and/or testing tool and analyze this information for feedback and display to a user. Alternatively, a separate processor in the injection apparatus and/or testing tool can process the information before sending the processed information to the output device for display.

In some embodiments, the injection apparatus can be configured to mimic certain muscle contraction conditions common with a particular type of injection. For example, this can include contractions of facial features, such as furrowing of an eyebrow, squinting of the eyes, or pursing of the lips. The removable skin can also include blemishes, such as scars or wrinkles.

In an embodiment, the layers of material surrounding the injection apparatus have different pigmentations. For example, in an embodiment where the injection apparatus has three layers of pigmentation, the first layer may be opaque, the second layer may be tinted, and the third layer may be clear. The pigmentation of the layers selectively alters the testing tool light to display a different color or intensity of light as it passes through each layer. This resulting attenuated light from the testing tool is then detected or viewed by the camera enclosed in the injection apparatus. The output device is configured with software to recognize the color, direction, and intensity of light detected by the camera. Based on the color, direction, and intensity detected by the camera, a software program may determine the depth, pressure, or angle of injection. Similarly, markings or other identification options can be used to identify the depth, pressure, or angle of injection as described below.

In an embodiment, a system for cosmetic or therapeutic training configured to aid in training a care provider to provide cosmetic or therapeutic injections is disclosed. The system includes a testing tool that has an injection needle head, the testing tool configured to emit light. The system also includes an apparatus configured to receive an injection and attenuate the light emitted by the testing tool, the attenuation representative of an injection parameter; and a light detector, the light detector positioned to detect the light attenuated by the apparatus. In an embodiment, the system includes a processor configured to receive and process an indication of the detected light from the light detector. In an embodiment, the system includes a display device. In an embodiment, the display device is configured to display the indication of the detected light from the light detector. In an embodiment, the indication of the detected light is an image. In an embodiment, the display device is configured to display injection measurement data. In an embodiment, the injection parameter is a depth of the injection. In an embodiment, the injection parameter is an angle of injection. In an embodiment, the injection parameter is pressure. In an embodiment, the processor is configured to determine an accuracy of the injection. In an embodiment, the apparatus includes a plurality of nesting layers, wherein each layer provides a different attenuation of light. In an embodiment, each of the plurality of nesting layers are colored. In an embodiment, at least some of the plurality of nesting layers are translucent. In an embodiment, the plurality of nesting layers include a removable skin layer, a muscle layer, and a nerve layer. In an embodiment, the removable skin layer is configured to represent one or more of different ages, ethnicities, races, textures, or thicknesses of human skin. In an embodiment, the removable skin layer is transparent and the muscle layer is visible through the skin layer. In an embodiment, the removable skin layer simulates cosmetic conditions. In an embodiment, one or more injection sites are positioned at locations on the injection apparatus which correspond to injection locations for cosmetic conditions and therapeutic treatment. In an embodiment, the testing tool comprises a light source configured to emit visible light. In an embodiment, the light detector comprises a camera.

In an embodiment, method of injection training is disclosed. The method can include providing a testing tool simulating a syringe and configured to emit light; providing an injection apparatus, the injection apparatus configured to provide a simulation of a testing site and configured to attenuate the light emitted by the testing tool according to a desired parameter of an injection; providing a light detector configured to detect the attenuated light; using the testing tool to inject the injection apparatus; and detecting, using the light detector, the light attenuated by the injection apparatus during the injection. In an embodiment, the method also includes analyzing the detected attenuated light from the camera to determine an accuracy of the injection. In an embodiment, the parameter under test is the depth and location of the injection. In an embodiment, the parameter under test is one or more of speed, pressure, angle, depth or location. In an embodiment, the injection apparatus is configured to attenuate the light by providing a plurality of nesting layers each including a different level of light attenuation. In an embodiment, each of the plurality of nesting layers is a different color.

In an embodiment, a testing tool is disclosed. The testing tool can include a needle; a barrel; and a light source configured to emit light from the needle. In an embodiment, the testing tool also includes a plunger. As will be understood by those of skill in the art, the testing tool described throughout this disclosure and in every embodiment of the disclosure can be configured to simulate all or various combinations of parts of a typical syringe or hypodermic needle. For example, this can include a needle, a barrel, and a plunger or any combination thereof. Also, any light source or combination of elements described herein can also be included in the testing tool. In any of the embodiments disclosed herein, unneeded or unnecessary parts of the testing tool can be left off. For example, in some embodiments, a plunger is unnecessary and left off the device.

In an embodiment, the testing tool can include a sensor configured to determine a relative position of the plunger with respect to the barrel. In an embodiment, the sensor is potentiometer. In an embodiment, the sensor is housed proximate the barrel. In an embodiment, the sensor is housed away from the barrel. In an embodiment, the testing tool includes a friction system configured to simulate an injection. In an embodiment, the needle is hollow. In an embodiment, the testing tool includes an optical fiber configured to transmit the emitted light to the tip of the needle. In an embodiment, the emitted light is visible light. In an embodiment, the emitted light is one or more of visible light, non-visible light, ultraviolet light, polarized light, infrared light or fluorescent light.

In an embodiment, an injection apparatus configured to simulate at least a portion of a patient under test is disclosed. The injection apparatus includes a first structure configured to simulate a portion of a patient under test; and at least one injection layer configured to simulate an injection condition, the injection layer configured to attenuate emitted light from a testing tool such that at least one testing parameter of a desired injection can be determined. In an embodiment, the injection apparatus includes at least two injection layers, wherein each injection layer is configured to attenuate the emitted light. In an embodiment, each of the two or more injection layers attenuates the emitted light differently. In an embodiment, each of the two or more injection layers is tinted with a different color and the emitted light is visible light. In an embodiment, the patient is a human. In an embodiment, the patient is an animal. In an embodiment, the first structure is a head. In an embodiment, the first structure is a back. In an embodiment, the first structure is a chest.

In an embodiment, a testing tool is disclosed. The testing tool includes a needle; and an optical fiber configured to receive emitted light from a light source through a proximate end of the optical fiber, the optical fiber further configured to emit light out of a distal end of the optical fiber, the optical fiber positioned in the needle so that light is emitted at a head of the needle. In an embodiment, the needle is a hypodermic needle. In an embodiment, the distal end of the optical fiber is located at a tip of the needle. In an embodiment, the emitted light is visible light. In an embodiment, the emitted light is one or more of visible light, non-visible light, ultraviolet light, infrared light or fluorescent light. In an embodiment, the testing tool includes a syringe. In an embodiment, the testing tool includes a barrel and plunger. In an embodiment, the testing tool includes a sensor configured to determine a relative position of the plunger with respect to the barrel. In an embodiment, the sensor is potentiometer. In an embodiment, the sensor is housed proximate the barrel. In an embodiment, the sensor is housed away from the barrel. In an embodiment, the testing tool includes a friction system configured to simulate an injection. In an embodiment, the testing tool includes a friction system configured to simulate an injection. In an embodiment, the needle is hollow.

In an embodiment, a method of using a testing tool for injection training is disclosed. The method includes providing a testing tool, the testing tool including a needle; an optical fiber configured to emit light out of a distal end of the optical fiber, the optical fiber positioned in the needle so that light is emitted at a head of the needle; and a light source configured to emit light through a proximate end of the optical fiber. The method also includes using the testing tool to inject an injection apparatus; and detecting the emitted light after attenuation by the injection apparatus to determine an injection parameter. In an embodiment, the needle is a hypodermic needle. In an embodiment, the distal end of the optical fiber is located at a tip of the needle. In an embodiment, the emitted light is visible light. In an embodiment, the emitted light is one or more of visible light, non-visible light, ultraviolet light, infrared light or fluorescent light. In an embodiment, the method further includes providing a syringe. In an embodiment, the method further includes providing a barrel and plunger. In an embodiment, the method further includes providing a sensor configured to determine a relative position of the plunger with respect to the barrel. In an embodiment, the sensor is potentiometer. In an embodiment, the sensor is housed proximate the barrel. In an embodiment, the sensor is housed away from the barrel. In an embodiment, the method further includes providing a friction system configured to simulate an injection. In an embodiment, the method further includes providing a friction system configured to simulate an injection. In an embodiment, the needle is hollow. In an embodiment, the method further includes storing the injection parameter in an electronic storage device. In an embodiment, the method further includes compiling a plurality of injection parameters from an injector and determining an accuracy rating of injection. In an embodiment, the method further includes publically publishing the accuracy rating.

In an embodiment, a method of rating an injector is disclosed. The method includes using an injection apparatus to detect injection parameters about an injection by an injector using a testing tool; and determining a rating of the injector from the injection parameters. In an embodiment, the injector is a primary care physician, dentist, veterinarian, nurse practitioner, nurse, physician's assistant, aesthetic spa physician, plastic surgeon, facial plastic surgeon, oculoplastic surgeon, or dermatologist. In an embodiment, the rating is an accuracy of injections. In an embodiment, the rating is an experience of the injector. In an embodiment, the rating indicates a quality of the injector. In an embodiment, the rating is publically published. In an embodiment, the rating is one or more of education, years of experience, performance results with the injection apparatus, or patient reviews.

BRIEF DESCRIPTION OF THE DRAWINGS

FIG. 1 depicts an embodiment of the injection apparatus, testing tool and output device.

FIG. 11 illustrates a front view of an injection apparatus for cosmetic training with cosmetic conditions labeled to corresponding injection sites on a muscle layer.

DETAILED DESCRIPTION

Figure 2A:
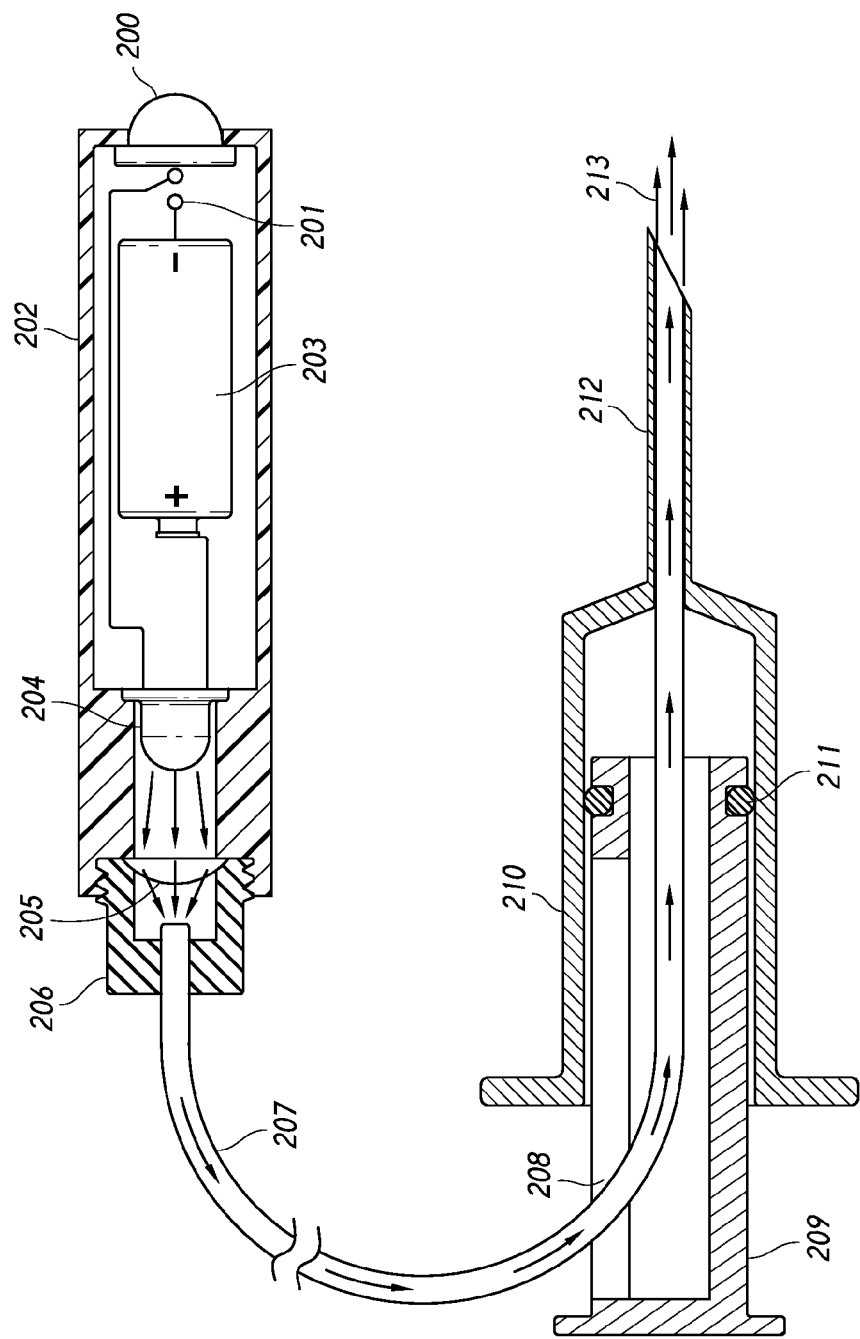
FIG. 2A depicts an embodiment of the testing tool.

Embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the present disclosure.

FIG. 1 depicts the use of an injection apparatus 100 used for injection training. The injection apparatus 100 can be used for any type of injection training involved with administering diagnostic and therapeutic chemical substances. For example, injection training can be provided for epidural techniques and intracardiac injections. In one embodiment, the injection apparatus 100 can anatomically model the face, neck, and head of a human or animal. Although not shown in the accompanying drawings, the injection apparatus can model other injection sites including the chest, arms, mouth, back, buttocks, etc. The injection apparatus 100 may also represent any body part of a human or animal, including internal organs. In some embodiments, the injection apparatus 100 may consist of a simulated skull and layers of muscle and skin.

A testing tool 110 is also illustrated which can be used with the injection apparatus 100 and in conjunction with a camera 120 located within the injection apparatus 100. The testing tool 110 may simulate any type of equipment used in connection with an injection or minimally invasive procedure, such as a needle, catheter or cannula. As described in further detail below, the camera 120 can capture visual indications of the user's injection using the testing tool 110. The visual indications provide an operator or user with information regarding the location, depth, pressure, or angle of the injection. In an embodiment, the testing tool 110 contains a light source that emits light through the needle portion of the testing tool which is used to aid in obtaining the visual indications detectable by a camera 120. The light source can emit visible light. In an embodiment, a gradient of white light is emitted through the needle portion of the testing tool. Other colors of visible light can also be used, such as green, blue, red, yellow or any combination of those colors. In an alternative embodiment, the light source may emit light along a spectrum of visible or non-visible light, such as fluorescent or ultraviolet light. In some embodiments, the light emitted from the light source is attenuated differently depending on which layer of simulated skin or muscle of the injection apparatus 100 is penetrated. Different colors, directions, graph lines, visual patterns, polarization, fluorescence, or intensities of light can be captured by the camera 120 as the testing tool 110 is injected through the different layers of material surrounding the injection apparatus 100. The resulting light detected by the camera 120 can be used to determine the location of the injection, the pressure exerted by the user, the angle of injection, or the depth of the injection. This information can be detected, for example by a camera 120, and communicated to a user interface device 140 for testing or certification purposes.

The camera 120 within the simulated skull of the injection apparatus captures the attenuated light of an injection through video recording and/or photographic images. The camera 120 can include a processor and can communicate the camera output to a user interface device 140. The information gathered from the camera 120 and testing tool 110 may be communicated to a user interface 140 for data collection, testing or certification purposes. The camera output can be raw or processed video or images obtained from the camera 120. The camera processor can include software configured to interpret the visual indications for testing purposes or can merely pass images to the user interface device 140 for further processing. In an embodiment, the user interface device 140 can also communicate instructions to the camera 120 and/or testing tool 110.

FIG. 2 depicts an embodiment of the testing tool 110. In one embodiment, the testing tool 110 includes a needle 212, plunger 209, and barrel 210. The testing tool 110 may be activated by pressing the switch button 200 which moves switch contacts 201 and connects the battery 203. The battery 203 and switch button 200 are within the housing 202 of the testing tool 110. The battery 203 powers the LED 204 to emit a light through a lens 205. The emitted light then travels through an optical fiber 207 that captures the focused light. Alternatively, the light can travel through a hollow needle, without the use of optical fibers. The optical fiber 207 is held within the plunger 209, barrel 210, and needle 212 of the testing tool 110 through a slide slot 208. Alternatively, the fiber optic and other components are all fully incorporated into the testing tool to create a standalone device. The light emitted from the LED 204 travels through the optical fiber 207 and is emitted at the tip of the needle 212 as a focused light 213. In one embodiment, the needle 212 of the testing tool 110 may be hollow and allow light to enter without a focused tip. The LED 204 may emit light of different spectrums through a lens 205. In some embodiments, the light emitted from the LED 204 is attenuated once it penetrates each layer of simulated skin or muscle. Once the needle portion 212 of the testing tool 110 penetrates through each layer of tinted material, different colors or intensities of light can be detected by the camera 120. In some embodiments, a friction o-ring 211 allows the plunger 209 to be pushed downward and causes the needle 212 to go forward for an injection.

In some embodiments, the light viewed by the camera 120 from the needle 212 can change from a round to oval shape. This can occur when the needle moves out of alignment with the camera 120. The length and width of the oval viewed by the camera 120 can indicate the angle of the injection while the direction of the oval along its longer axis can indicate the direction of the injection.

In some embodiments, fluid can be stored within the testing tool 110 and injected into the injection apparatus 100. The fluid injected can simulate the consistency of the injection substance that would be injected for a real treatment. Once the injection apparatus 100 receives the injection, a camera 120 captures the location, speed, pressure, and angle of the injection. The camera 120 sends this information in video or photographic form to the processor 604 which analyzes the detailed information and determines desired injection parameters. In some embodiments, the data associated with the injection can be determined by the testing tool 110 sending information wirelessly to the processor 604. For example, the testing tool may detect the friction experienced by the friction o-ring 211 to send to the processor 604 information about the speed and pressure of an injection. In one embodiment, an accelerometer can be attached to the testing tool 110 to provide information on an angle of injection. Another process for conveying information to the processor 604 includes alternating frequencies or patterns of light emitted by the LED. Alternatively, the information from the camera 120 and testing tool 110 can be sent directly to the output device 140 for processing.

In one embodiment, the plunger 209 of the testing tool 110 may be able to detect the angle, speed, friction, and depth of an injection. This can be accomplished with a wired or wireless electrical signal being transmitted from a sensor placed in the testing tool 100. In some embodiments, a cable can be placed parallel to the light fiber that can read the injection parameters, such as the pressure, speed, or acceleration of the injection. For example, the electrical signal transmitted from the sensor can detect 0-5 volts of electricity, which can represent the amount of pressure being exerted by the user when utilizing the testing tool 110. In other embodiments, the electrical signal may emit a certain frequency that represents the pressure exerted. For example, a frequency of 100 Hz can represent low pressure while a frequency of 1,000 Hz can represent high pressure exerted by the user. In an embodiment, the LED can be modulated at a modulation rate corresponding to an angle, speed, friction or depth of an injection. This modulated light can be detected by the camera and used to determine the desired injection parameters without the need for a separate data communication path between the testing tool and the rest of the system. In some embodiments, a wireless transmitter can be placed in the testing tool that communicates directly to the user interface device 140 and displays the parameters of the injection.

In some embodiments, the testing tool 110 can inject a fluorescent fluid into the injection apparatus 100. The layers of simulated muscle and skin may be configured to have a reservoir that accepts these fluid injections. The fluorescent fluid may be visible through transparent, opaque, or lightly pigmented material in the simulated skin and muscle layers. In one embodiment, a UV lamp may be placed within the injection apparatus 100 in order for a user to clearly see the injection and injected fluid going into the injection apparatus 100.

In some embodiments, the testing tool 110 may also be powered with a plug in cable. The testing tool 110 can send information over a wireless network or portable computer to process information about an injection. The signals may send information related to the 3D location, depth, intensity, or pressure exerted by the user when practicing the injection.

Figure 2B:
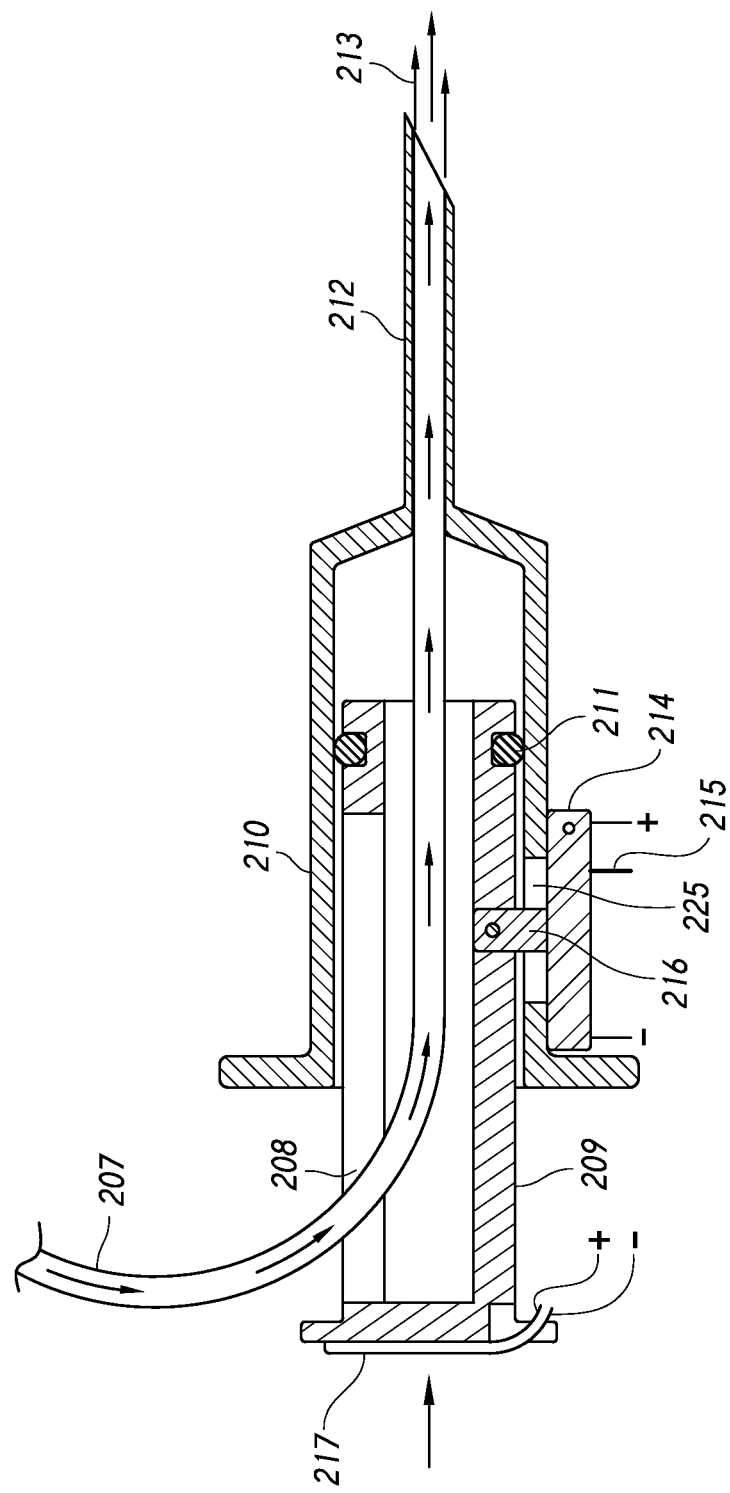
FIG. 2B depicts an embodiment of the testing tool with a linear potentiometer fixed to the testing tool.

FIG. 2B depicts an embodiment of the testing tool with a position transducer, such as, for example, a linear potentiometer fixed to the testing tool. The linear potentiometer can be used to track the depression of the plunger 209 relative to the barrel 210. This information can then be used by the system to determine a volume of injection. This information, in connection with the location and depth information obtained by the injection apparatus can be used to determine fluid volume distribution information about the injection.

In some embodiments, the transducer or potentiometer can be connected to a slider 216. The linear potentiometer 214 measures the position of the plunger 209 of the testing tool relative to the barrel 210. In some embodiments, the linear potentiometer 214 may be fixed to the plunger 209 of the testing tool. A slider 216 may be attached through a slot 225 in the barrel 210 and mated with a pocket within the plunger 209. The slider 216 moves with the plunger 209 to allow the transducer to output the position of the plunger 209 through an output pin 215. The transducer then electronically communicates through a connection with a processor 604, which calculates the simulated volume and distribution of the injection. This calculation may be completed by using the parameters of the plunger 209 displacement and the diameter of the barrel 210.

In some embodiments, the testing tool determines the pressure applied by the injector. This can be accomplished by measuring the force applied to the plunger 209 through a thin film force sensor 217 on the plunger 209 flange. Electrical connections to the force sensor and linear potentiometer may be placed along with the optical fiber 207 in a multi-lumen sheath. The force sensor 217 electrically communicates with a processor 604 (FIG. 6) and send the parameters associated with the applied force to the plunger 209. The injector can be used for various procedures with various needle sizes, medication viscosities, and skin or muscle properties.

Figures 2C, 2D:
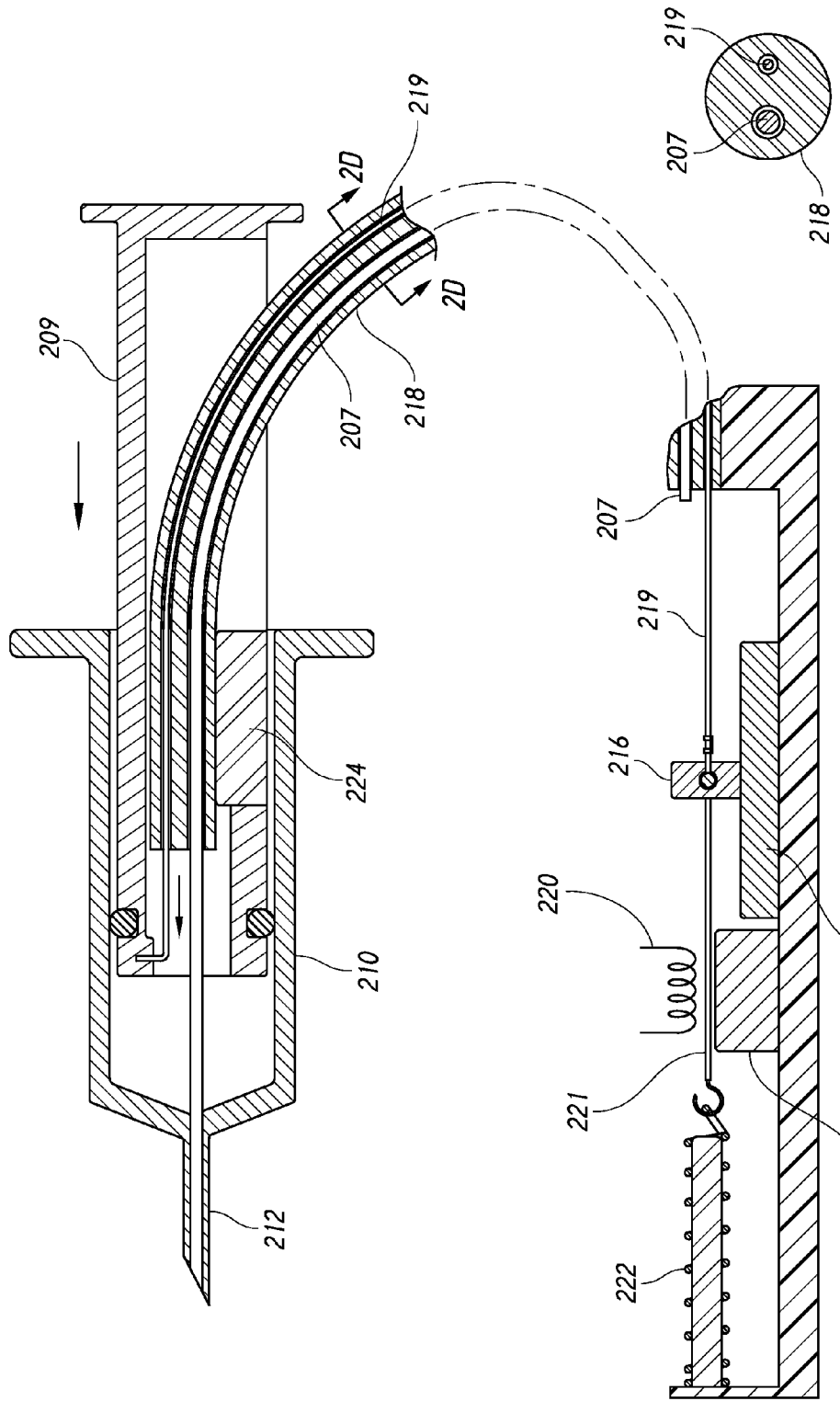
FIG. 2C depicts an embodiment of the testing tool with a linear potentiometer remotely connected to the testing tool.
FIG. 2D depicts a cross section of the multi-lumen sheath.

FIG. 2C depicts an embodiment of the testing tool with a linear potentiometer 214 remotely connected to the testing tool. The motion of the plunger 209 is measured using a pull wire 219 that is connected to the plunger 209 and to the slider 216 of a remote transducer. The pull wire 219 may be routed along a multi lumen sheath 218 that carries the optical fiber 207.

In an embodiment, the remote transducer is used in conjunction with a force application system to simulate the viscosity encountered during an injection. In an embodiment, a needle drag can be designed to simulate a real injection. The needle drag can be determined based on the elasticity of the injection apparatus layers (for example, as measured in durometers), the coefficient of friction between the plunger and the barrel and the needle diameter and length. FIG. 2C illustrates a force application system including a tension spring 222, steel tensile strip 221, steel friction block 223, and a controllable friction device, such as an electromagnetic brake. The electromagnetic brake is activated when current from a power source is applied to a coil 220. Once current is removed from the coil 220, the electromagnetic brake returns to its resting state. These elements of the testing tool provide the resistance necessary for a simulated injection. The electromagnetic brake can be controlled by the processor 604 to simulate the feel and resistance of an actual injection. Alternatively, the parameters of the brake force applied can be preset. A fixation post 224 may be used to lock the barrel 210 and multi lumen sheath 218 together. In some embodiments, the electromagnetic brake may be adjusted to simulate the resistance of skin, tissue, or muscle that the needle 212 would be penetrating. For example, an injector performing a lumbar nerve root sleeve injection would be able to feel the resistance of a fluid containing corticosteroid and long-acting local anesthetic. The electromagnetic brake also provides the resistance corresponding to a hypothetical patient's skin, tissue, or muscle. The injector applies the corresponding amount of force necessary to correctly perform the injection.

FIG. 2D depicts a cross section of the multi-lumen sheath 218. The multi lumen sheath 218 holds the optical fiber 207 and the pull wire 219. The pull wire 219 may be attached to the plunger 209 and moves the slider 216. As the plunger 209 moves, the pull wire may move through the multi lumen sheath 218.

Figure 3:
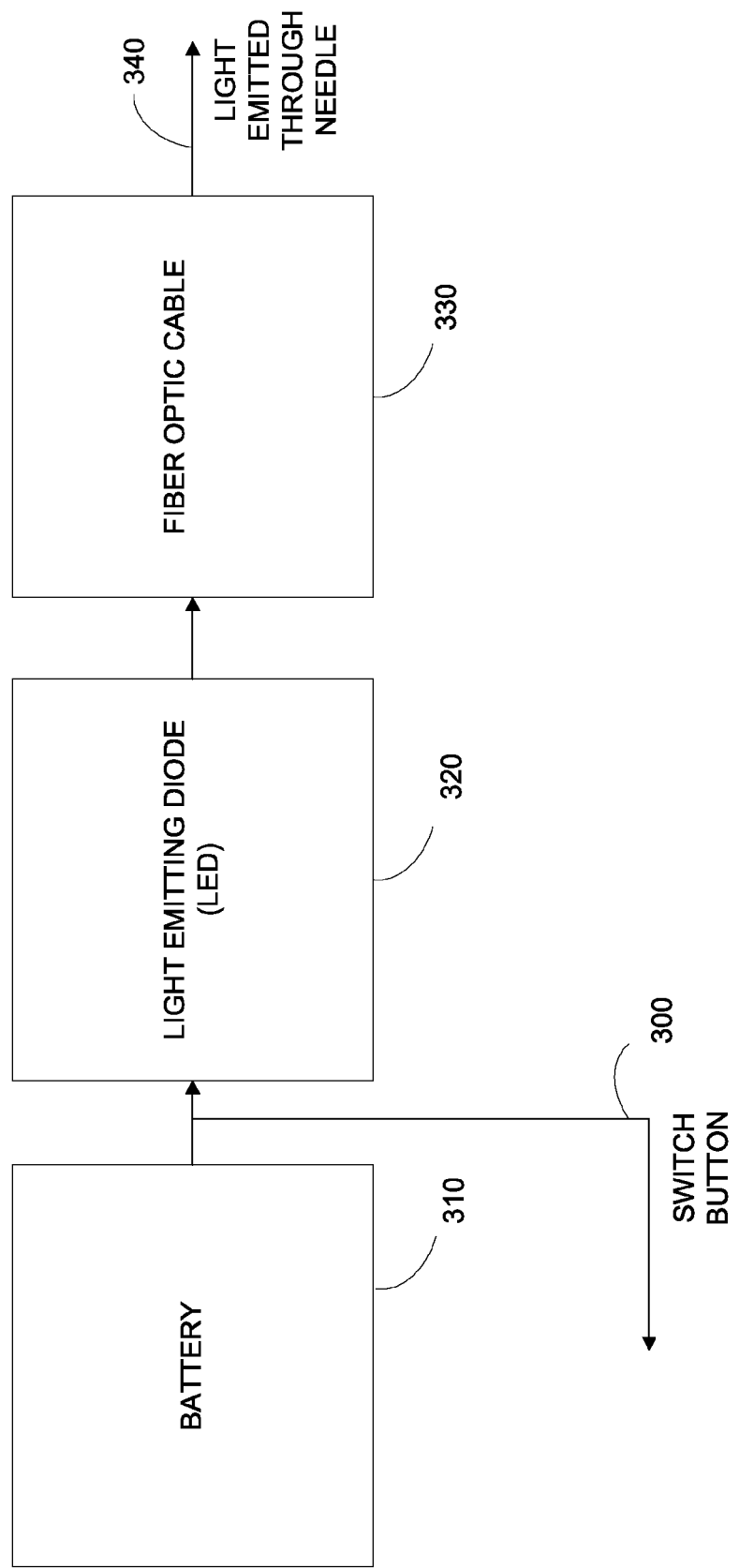
FIG. 3 depicts a schematic diagram of a testing tool for injection training.

FIG. 3 depicts a schematic diagram of a testing tool for injection training. In one embodiment, the testing tool 110 has a needle 212, plunger 209, and barrel 210. The testing tool 110 can have a light fiber and/or light emitting diode (LED) 320 as a light source. The focus of the light source may be on the end of the fiber inside the needle portion of the testing tool 110. The testing tool 110 is activated by a switch button 300 which connects the battery and activates the LED 320. In some embodiments, the testing tool 110 is a portable battery operated, fully functional, standalone device. The battery 310 powers the LED 320 and activates the LED 320 once the switch button is turned to the on position. The LED 320 emits light through a fiber optic cable 330 so that light 340 shines through the needle portion of the testing tool 110. In some embodiments, the testing tool 110 may be connected through a cable to a processor 604 which is able to communicate with the testing tool 110 in order to receive information on testing parameters and provide programming instructions to the testing tool 110. In other embodiments, the testing tool 110 may wirelessly communicate with the processor 604.

Figure 4A:
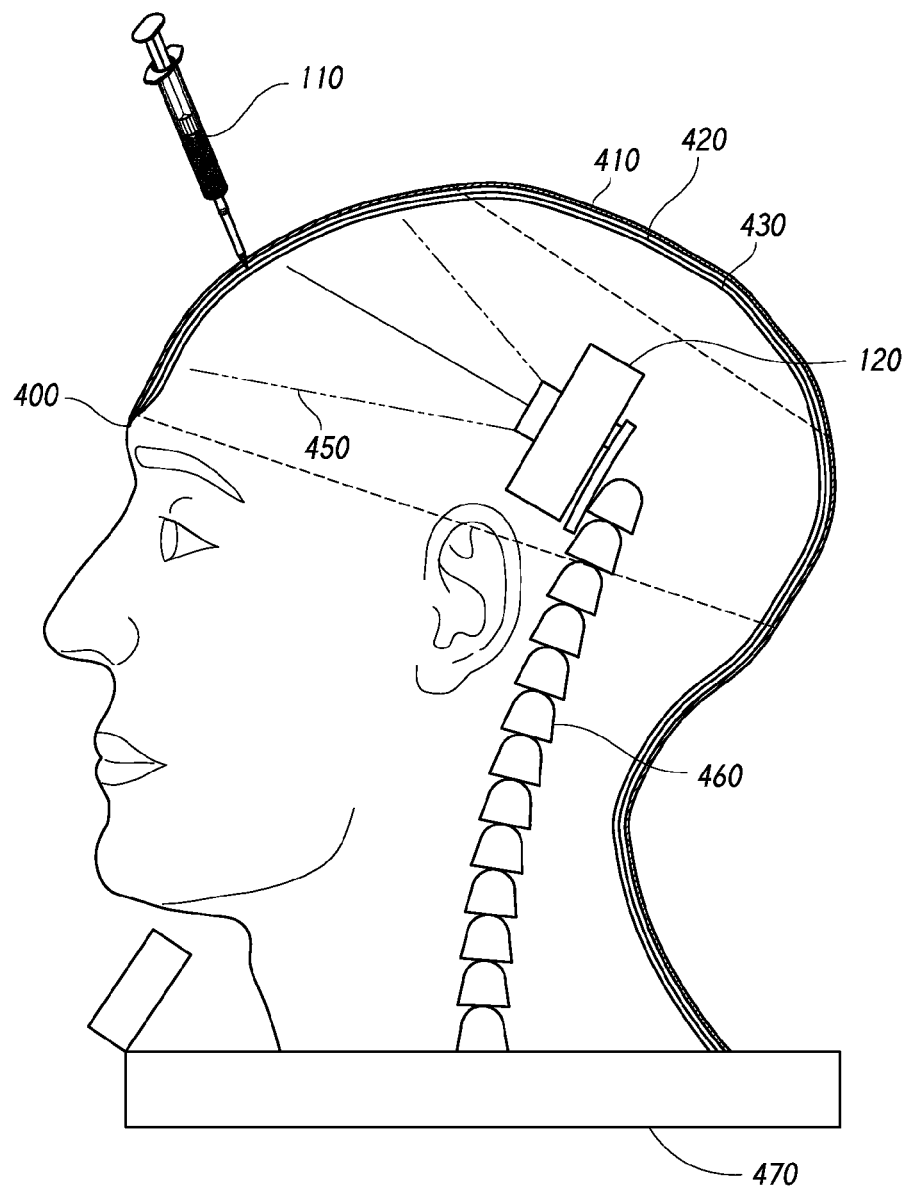
FIG. 4A depicts the side view of one embodiment of the injection apparatus with a surrounding testing layer of simulated skin and muscle covering a portion of the injection apparatus.

FIG. 4A depicts a side view of one embodiment of the injection apparatus 100 with a surrounding removable layer divided into three separate simulated human skin and muscle layers 410, 420, 430. In some embodiments, the skin layers may be separated to represent the epidermis, dermis, and hypodermis. The layers of skin and muscle may be of uniform or different densities. In other embodiments, the layers of skin and muscle may be thicker or thinner to simulate the skin of patients with uneven skin, muscle layers, or damaged skin. In some embodiments, each separate layer may be of a different density or color. For example, in FIG. 4, the first layer 410 may represent the epidermis as opaque. The second layer 420 may represent the dermis and as tinted. The third layer 430 may represent the muscle and as clear. More or fewer layers of simulated skin and muscle can also be used depending on the desired injection and the level of detail required.

In some embodiments, each separate layer of skin or muscle 410, 420, 430 may be of a different transparency, density or color. In some embodiments, the different intensity or colors can be viewed by the camera after the testing tool 110 is inserted into the simulated skin or muscle. This can allow a camera 120 to send information to a processor 604 related to the location, pressure, angle, or depth of an injection. In other embodiments, the injectable muscle and skin layers may be of uniform density, consistency, or color. In some embodiments, the injectable muscle and skin layers 410, 420, 430 may be made of an elastomer. In an embodiment, the elastomer may simulate the elasticity of human skin and range from 5-35 on the durometer "A" scale. The simulated skin and muscle layers 410, 420, 430 may also consist of different angled fibers that deflect light emitted from a testing tool in different directions to allow for location, depth, angle and pressure analysis based on the optical properties observed. In an embodiment, the fibers can be a pattern printed on each skin or muscle layer 410, 420, 430 that selectively block light viewed by the camera. Depending on the angle of the fibers within each layer of the skin and muscle layers 410, 420, 430, the light emitted from a testing tool may be deflected at that angle. For example, the first layer 410 may have threaded angled fibers directed at a 45 degree angle. The second layer 420 may have threaded angled fibers directed at a 55 degree angle. The third layer 430 may have threaded angled fibers directed at a 65 degree angle. Depending on which layer an injector has penetrated, the light emitted from a testing tool 110 may be deflected in a different direction. If the injector has penetrated the second layer 420, the light should be deflected at a 55 degree angle. The deflection of the light emitted from the testing tool 110 is captured by a camera 120 and sent to a processor 604. The processor 604 analyzes the intensity, deflection, and clarity of the light emitted from the testing tool 110 to generate results about the injection.

In some embodiments, the layers of skin or muscle 410, 420, 430 may be dyed with carbon black particles or similar light-obscuring agents. The density of the carbon black particles can be adjusted to substantially block emitted light from reaching the camera through all layers. As the needle portion of the testing tool 110 travels through each layer, more light is viewed by the camera. The carbon black particles obscure light so that an injection into each layer may represent a different intensity of light. In some embodiments, this will allow a camera 120 placed within the injection apparatus 100 to detect the layer of skin or muscle 410, 420, 430 which is being penetrated by the light source. In one embodiment, the different layers of skin or muscle may be dyed with translucent color. These translucent layers will attenuate the light emitted from a testing tool in different ways. The degree and color of attenuation of the light after it has traveled through the simulated muscle and skin layers can then be detected by the camera and used to analyze the injection.

In an embodiment, the system includes an injection apparatus 100 for injection procedures on different parts of the human body. In an embodiment, there are at least three nesting layers of the apparatus: the skeletal structure layer, muscle layer, and top layer of simulated skin. A nerve layer can also be present within the muscle layer. This allows trainees to visualize and study the layers of muscle and nerves underneath the skin layer to become familiar with human facial anatomy. Veins or arteries can also be included and embedded within the muscle layer. The veins or arteries may be of a different color or density than the muscle and skin layers. The injectable muscle and skin layers 410, 420, 430 anatomically match that of the human body. In some embodiments, the injection apparatus 100 may simulate the internal organs or other body parts of a human or animal. In some embodiments, injectable muscle and skin layers 410, 420, 430, may be color coded so that a trainee may be able to identify the different sections of the human body or muscles associated with each simulated condition.

The depicted layer on the injection apparatus 100 in FIG. 4A simulates human skin and muscle and has the same feel, permeability, and appearance as human skin. The skin and muscle layers may be removable, reusable, and replaceable to simulate a variety of patients having different injection conditions. For example, the skin may vary by the age, ethnicity, race, texture, or thickness of different test patients. In some embodiments, the skin may simulate certain cosmetic conditions. For example, the skin may have wrinkles, scars, hyperpigmentation, lacerations, or other blemishes typically treated by injections. The various embodiments of skin types allow the trainee to gain a wide variety of experience dealing with different skin types. The muscle layers may consist of thicker or thinner layers to represent different densities in muscle tone. In some embodiments, the different density or color of the skin or muscle may allow a testing tool and camera to detect the depth and location of an injection.

In some embodiments, the injection apparatus 100 is configured to represent human facial features, such as those features associated with smiling or frowning, as would be encountered during certain cosmetic or therapeutic injections. In some embodiments, the apparatus can model various cosmetic conditions or damaged areas of the human body. For example, these cosmetic conditions may include glabellar frown lines, horizontal forehead lines, temporal brow lifts, crow's feet (lateral canthal lines), lower eyelids, nasalis bunny lines, vertical lip lines, gummy smiles, nasolabial folds (NLFs), marionette lines, pre-jowl sulcus, labiomental crease, and midface, facial lipoatrophy, lip augmentation, mouth frowns (depressor anguli oris), apple dumpling chin, horizontal neck lines, vertical platysmal bands, acne blemishes, accident scars, or asymmetry. In some embodiments, the skin can be manipulated to mimic actual facial movement, such as furrowing of the brow, squinting of the eyes, and pursing of the lips. Users of the injection apparatus may be able to pinch the skin, stretch the skin, or grab a portion of the muscle in order to simulate a real injection. The injection apparatus 100 may be programmed to display various cosmetic conditions through a user interface device 140. There may also be buttons available on the injection apparatus 100 for programming cosmetic conditions. In some embodiments, the skin layer may be manufactured with pre-determined cosmetic conditions.

In one embodiment, programs for individual injection sites may be sold separately or in a package. The user interface device 140 may be updated with various injection tests for different parts of the human or animal body. For example, an injection test can be purchased for Botox® injections. The injection sites for parts of the human face could be downloaded onto the user interface device 140 and unlocked by a user. For example, the targeted injection sites for toxin cosmetic injections for a human face may include the frontalis (forehead lines), glabellar complex (procerus and corrugators) frown lines, orbicularis oculi-lateral canthal area, crow's feet lines, nasalis-bunny lines, orbicularis oris-vertical lip lines, depressor anguli oris, mentalis, masseter, platysma, depressor septi nasi, levator labii superioris alaeque nasi, gland hypertrophy, or labial artery. The program can communicate with the processor 604 to control the movement of the camera 120 to record or measure the specific injection sites for injection testing. The program can also communicate with the processor 604 to change the pigmentation or color of the skin layers 410, 420, 430 of the injection apparatus 100. In some embodiments, the program can be set to simulate a specific type of injection scenario. For example, a user can set the user interface device 140 to simulate crow's feet on the injection apparatus 100. The skin layers 410, 420, 430 would be mechanically moved to simulate the wrinkles at the edge of the injection apparatus 100 to form crow's feet. Once the user correctly injects the injection apparatus 100 at the injection site for crow's feet, the injection apparatus 100 would mechanically smooth out the wrinkles from the crow's feet.

In one embodiment, the program can inform the user of the type of treatment performed on the injection apparatus 100 through the user interface device 140. For example, the user interface device 140 may educate the user on the type of treatment, such as whether it is therapeutic, sub-therapeutic, or super-therapeutic.

The injection apparatus 100 may also be used for therapeutic treatment training. These treatments may include those related to blepharospasm, strabismus, or chronic migraines, and others. For example, Botox® injections can be practiced to induce localized, partial paralysis on the apparatus for treatment of blepharospasm. In some embodiments, the injection apparatus may be manipulated to display the different physical features associated with conditions requiring therapeutic treatment. For example, the injection apparatus 100 may display a squinted eye or be cross-eyed when it is programmed as a patient with strabismus. Upon therapeutic treatment by a trainee, the injection apparatus 100 mechanically readjusts to fix the condition.

In some embodiments, the base layer 400 allows the injection apparatus 100 to keep its structure and holds the components of the injectable muscle and skin layer in place. The base layer 400 may be mechanical and moveable in response to an injection from the testing tool 110. The base layer 400 may be mapped with a grid of target zones. For example, the inside or outside of the base layer 400 may have imprinted lines that represent zones of injection. The grid of target zones may correspond to an image on a user interface device 140 that is able to show the accuracy of an injection. The grid can show the face from the inside of the camera and what the muscles look like. This can occur, for example, in a training mode. In some embodiments the top skin layer 410 may have visual targets which display the location for injection corresponding to a cosmetic condition or therapeutic treatment. These visual targets may be color coded so that a user may be different injection zones that should be targeted for administering different injections.

In some embodiments, the base layer 400 of the apparatus may be a clear plastic shell. The plastic shell layer may be covered with removable layers of elastomer membranes simulating human muscle or skin. The plastic shell may simulate the look of any human body part, including any internal organs. In some embodiments, the injection apparatus 100 simulates an entire human or animal body part with or without removable layers of elastomer membranes simulating human skin or muscles.

In an embodiment, the injection apparatus may have a camera 120 attached to a pivotable stand 460 and placed within the injection apparatus 100. The pivotable stand 460 may be attached to a removable base 470 that allows a user to physically change the direction of the pivotable stand 460. In some embodiments, the pivotable stand 460 may be mechanically movable upon detection of a signal received through a processor 604. The processor 604 may receive a signal to change the location of the pivotable stand 460 through a output device 140.

In some embodiments, the camera 120 may be positioned so it may swing into different positions in response to a shift gate. This allows a user to move the camera 120 to focus on different target zones without having to manually move the camera within the injection apparatus 100. The camera 120 may include an angular grid sensing filter that can detect its position and rotate itself according to a displayed grid within the injection apparatus 100. In an embodiment, the camera 120 is set to focus on either color or line orientations within the injection apparatus 100. The camera 120 may read a user's injection based on the information received from the light emitted from the testing tool 110 in conjunction with the location determined by a grid embedded in the base layer 400 of the injection apparatus 100.

In some embodiments the camera 120 may have a broad or focused range 450. For example, a broad range camera may be used when there is no specific target area that is being focused on for testing or certification purposes. A focused range camera can be positioned to aim at a zone for injection. In some embodiments, the camera 120 is configured to communicate with a user interface device 140 to display the results of an injection. In an embodiment, the results of the injection may be determined by the intensity and color viewed by the camera 120 after the testing tool 110 has been injected into the different layers of skin or muscle. The range 450 of the camera 120 may be manually adjusted by setting the camera to encompass a smaller or bigger range. The range 450 of the camera 120 may also be adjusted by inputting a grid location into the output device 140 and communicated to the camera 120. The camera 120 then adjusts its targeted location.

The camera 120 can output video to a user interface device 140 through a wired or wireless connection. In an embodiment, the output device 140 is equipped with software to read and analyze the results obtained from the video. In an embodiment, the software is able to analyze the results and generate a score or evaluation of the user's injection. The software can also report and capture data on the trainee's experience. The software may also play back the user's injection and display errors or provide feedback acceptable injections. In an embodiment, the software includes a biometric sensor to identify each trainee.

Figure 4B:
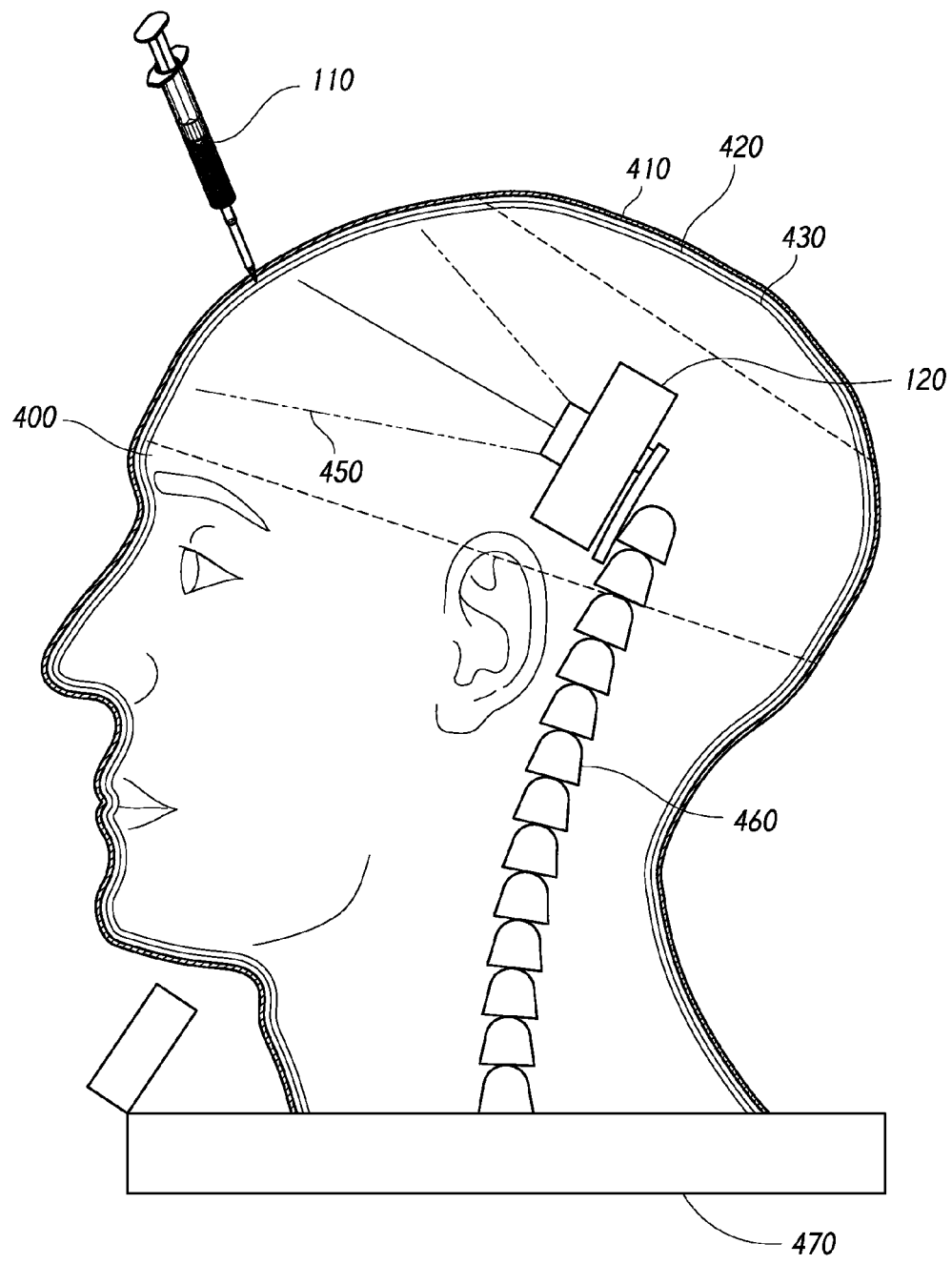
FIG. 4B depicts the side view of one embodiment of the injection apparatus with a surrounding testing layer of simulated skin and muscle covering the entire injection apparatus.

FIG. 4B depicts a side view of one embodiment of the injection apparatus 100 with a surrounding removable layer including at least three simulated human skin and muscle layers 410, 420, 430. The surrounding removable layer may cover one section of the injection apparatus 100 or the entire injection apparatus 100, for example, as illustrated in FIG. 4B. In some embodiments, the human skin and muscle layers 410, 420, 430 can be removed separately. As discussed above, more or fewer skin and muscle layers can be used and the present disclosure is not intended to be limited to three layers.

In an embodiment, the injector or administrator of injection training may choose to focus on a specific area of the injection apparatus and only have the removable layer surrounding that area. The injector may then observe the injection apparatus 100 to see how an injection penetrates through the different layers of skin, muscle, and nerves. This embodiment may be used, for example, for novice injectors who require visual guidance for the depth of their injections.

Figure 5:
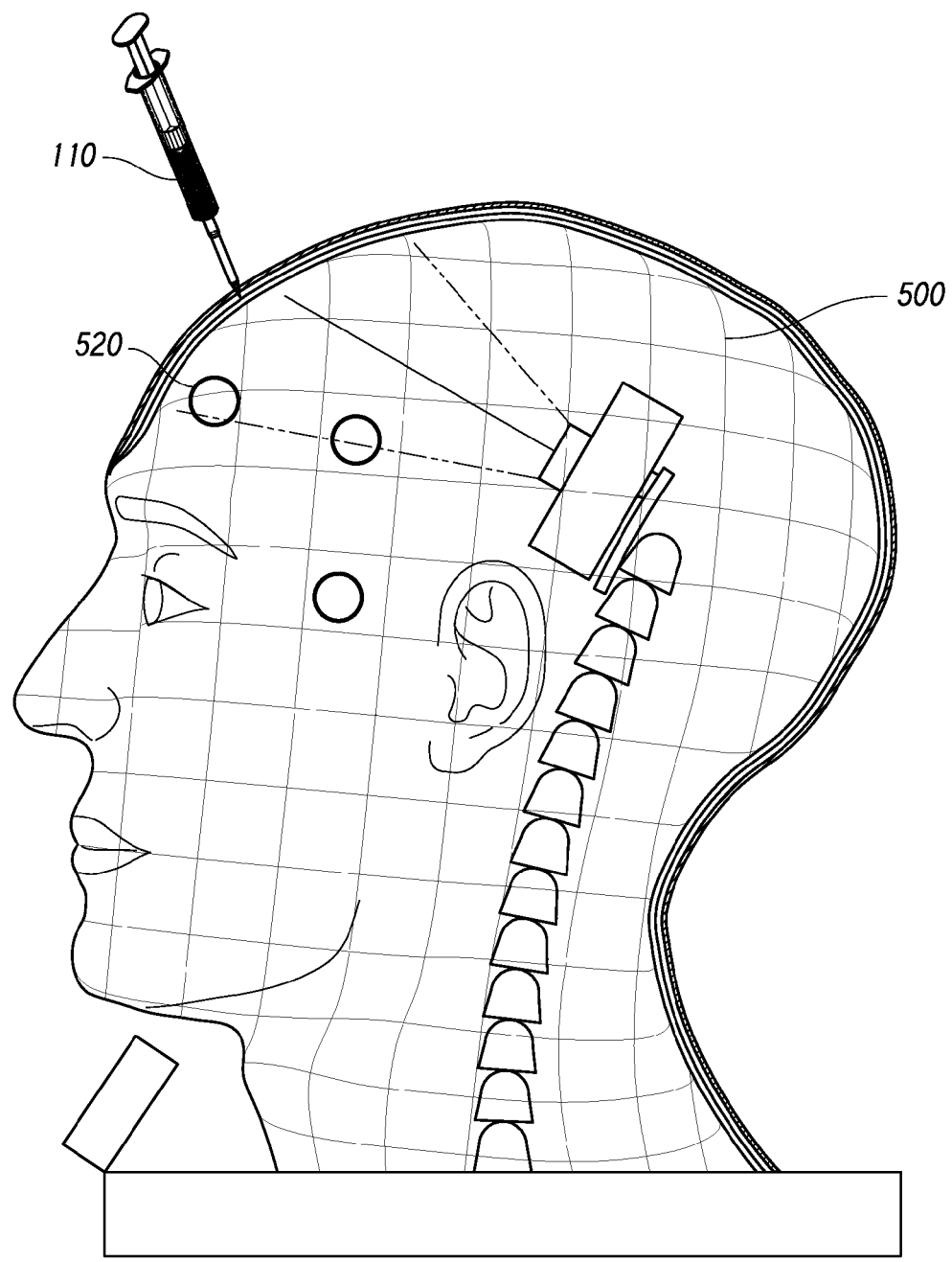
FIG. 5 depicts the side view of one embodiment of the injection apparatus with a grid displayed with injection sites.

FIG. 5 depicts the side view of an embodiment of the injection apparatus 100 with a grid displayed with injection sites. The grid lines 500 are used by a user or a camera 120 to determine the location of an injection site 520. The grid lines 500 may represent locations on an x-y plane or a three dimensional x-y-z axis so that a camera 120 may easily transfer location data to a processor 604. The grid lines 500 may be placed in an arrangement where each created section may represent an injection site 520. The sections may also be targeted areas that are used by the camera 120 to indicate where to focus for a particular injection. The grid lines 500 may be placed in different directions long the injection apparatus 100 or angled to accommodate any grooves or bumps on the injection apparatus 100.

In some embodiments, the injection apparatus 100 may have sensors embedded within the different human skin and muscle layers 410, 420, 430. The sensors may be located on an injection site 520, multiple injection sites 520, or continuously throughout the entire human skin and muscle layers 410, 420, 430. Once an area has been treated by an injection, the sensor may communicate with the testing tool 110 or the injection apparatus 100 to provide the information associated with the injection. For example, the sensor would be able to test reads the treatment from the sensors. The pressure applied to the area of injection may be detected by the training tool and the parameters of the injection may capture the depth, pressure, and angle of a user's injection. The parameters may then be compared to a pre-determined treatment and provided to a user interface device 140, which displays the testing results.

In some embodiments, the injection apparatus 100 may have inflatable pads embedded within the different human skin and muscle layers 410, 420, 430. The inflating and deflating of the pads may be initiated by an attached sensor detecting the penetration of an injection. The inflatable pads may be located on the injection site 520. The inflatable pad may independently inflate or deflate proportionally to the location, depth, pressure, and angle of a user's injection. The inflation and resulting size of the pads may differ at various injection sites 520, depending on the natural human reaction to an injection in that area. Once a user has completed an administered test, the inflatable pad may deflate and return the human skin and muscle layers to their original condition. The inflation pads allow the asymmetries of an injection to be observed and addressed by the injector. In an embodiment, the testing tool injects air into the inflatable pads, skin and/or muscle layers so that a user can observe how the injection has affected the apparatus. This allows the trainee to see in real time the effect of the injection. For example, the effect can be watching the apparatus "age". In an embodiment, the trainee can also deflate the fat pads. This allows a trainee to practice determining how much injection is required for a given patient.

In some embodiments, the injection apparatus 100 can be configured to turn on the measurement and/or analysis of different injection sites 520. A software program communicating through the user interface device 140 can selectively enable certain procedures, for example, through separate software purchases or upgrades related to particular injection sites 520. For example, the injection sites 520 for Botox® procedures can be enabled. The injection sites 520 for treating cosmetic conditions such as furrowed brows, crow's feet, or adding volume to lips can also be separately enabled. Once the testing tool 110 injects that particular injection site 520 corresponding to the cosmetic condition, the camera 120 views the injection and communicates the results to the processor 604. The results are generated and displayed through the user interface device 140.

Figure 6:
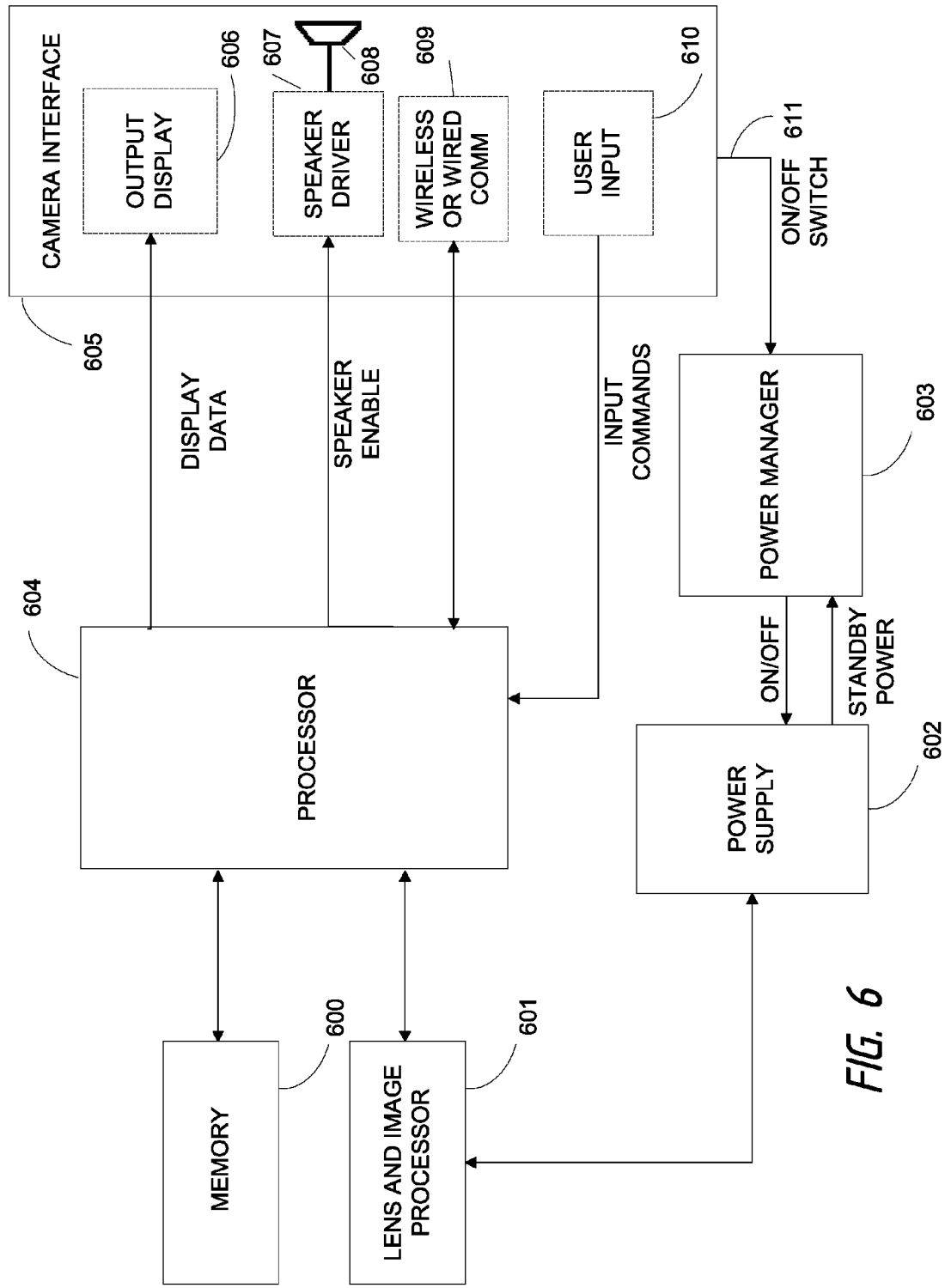
FIG. 6 a schematic diagram of the camera system.

FIG. 6 depicts further detail of the camera 120. The processor 604 controls the various functions of the camera 120 and the camera interface 605. The camera interface 605 can include, for example, an optional output display 606, optional speaker driver 607, optional speaker 608, optional wired or wireless communication transceiver 609, optional user input 610, and on/off switch 611. The processor 604 can transfer data to the output display 606, including display updates and visual alarms. The processor 604 can also be configured to interpret user inputs from the user input 610. The camera interface 605 may receive information from the user input 610 and send the user input data through the processor 604 so that the display data generated on the output display 606 can change according to a user's selection through the user interface device 140. The processor 604 may generate various alarm signals when the user is in the testing or training mode of the injection apparatus 100. The processor 604 controls a speaker driver 607 which then actuates a speaker 608 to provide real-time information regarding a user's progress for injections. The speaker 608 may provide audible indications, allowing the user to know when an accurate or inaccurate injection has been made. For example, the speaker 608 may emit a buzz sound when the injection is inaccurate and a beep sound when the injection is accurate.

The camera 120 receives its power from batteries in the camera or through a power supply 602. A power manager 603 monitors the on/off switch of the camera 120 and the output device 140 and turns each on or off accordingly. The batteries in the camera 120 may either be alkaline rechargeable batteries or another renewable power source. The camera 120 may also be powered with a plug in cable. In some embodiments, the camera can send information over a wireless network or directly to portable computer to process information about an injection using the wireless communication transceiver 609. The wired or wireless transceiver 609 can communicate over any known protocol including Bluetooth, Zigbee, WiFi, Ethernet, USB, or any other wired or wireless communication protocols.

A non-volatile memory 600 is connected to the processor 604 via a high-speed bus. In the present embodiment, the memory 600 is erasable and allows a user to store information including operating software, user configurable command options and information related to different types of injections, including recorded images or video. The memory 600 may also store user-specific data. For example, a user who has completed several injections on a certain day may store results of those several injections and access the results at a later time. In addition, information obtained by the injection apparatus can be stored and sent to a central repository for analysis with testing information from other devices. The central repository, can be, for example, a server or cloud computing device.

Figure 7:
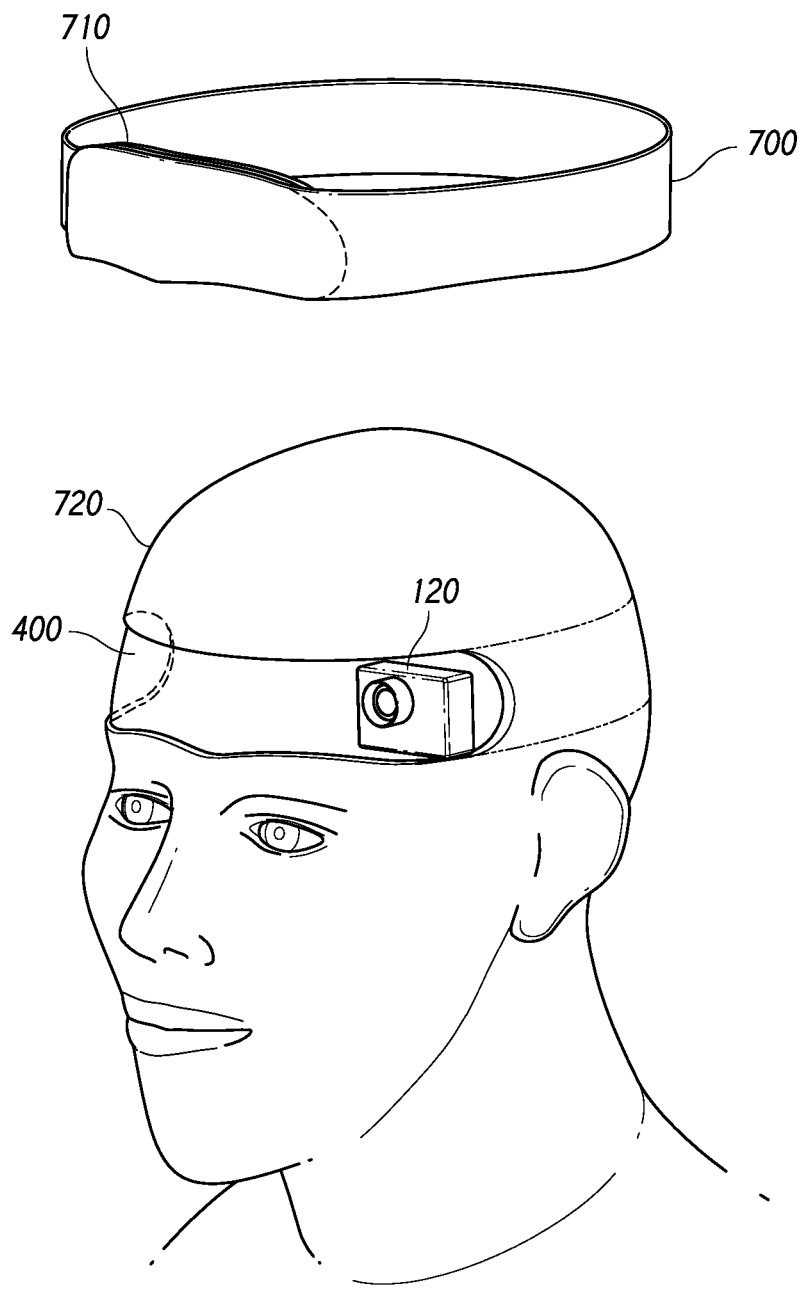
FIG. 7 illustrates a view of an embodiment of the injection apparatus with a removable band.

FIG. 7 illustrates a view of one embodiment of the injection apparatus 100 with a removable band 700. The removable band 700 allows for replacement of portions of the injection apparatus without the need to replace larger portions 720 of the simulated tissue. Multiple different removable bands can also be used. For example, a forehead band can be used in conjunction with a separate cheek skin band. In some embodiments, a removable band 700 may be placed on the base layer 400 of the injection apparatus 100. These embodiments allow a user to replace only the targeted injection areas. The removable band 700 may be placed on any portion of the injection apparatus 100. For example, testing for an injection involving cardiac treatment may require a removable band being placed over the area of the simulated heart that needs treatment. The removable band 700 may have layers of simulated human skin or muscle 700 attached. Each separate layer of skin or muscle 700 may be of a different transparency, density, or color. In some embodiments, the opaque layer obscures light from the needle portion of the testing tool 110 being inserted through shallower layers or muscle or skin 700 from being viewed by the camera. For example, in an embodiment with three layers of muscle or skin, the top layer may be opaque, the middle layer may be tinted red, and the bottom layer may be green and tinted. In some embodiments, the layers may be composed of material with different angled threaded material. This angled threading will deflect the light emitted from a testing tool in different directions so that the camera may capture the depth, pressure, and angle of a user's injection.

Figure 8:
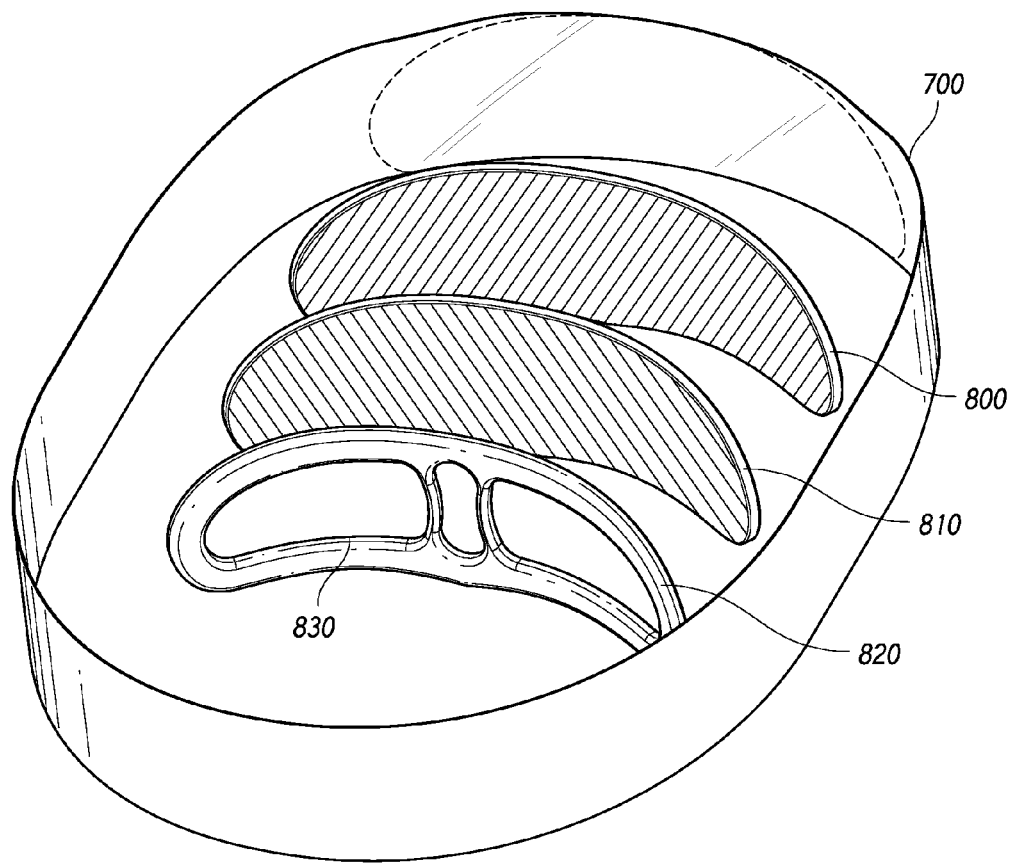
FIG. 8 depicts an exploded perspective view of an embodiment of a removable band.

FIG. 8 depicts an exploded view of an embodiment of a removable band 700 which can be used in conjunction with the injection apparatus. In this particular embodiment, there are three layers of the removable band 700 which are visually exploded for explanatory purposes. The layers 800, 810, 820 may consist of different materials, colors, or angled threading. For example, in FIG. 8, the first layer 800 may be made of a transparent elastomer layer with surface lines that are based in a right direction. The second layer 810 may consist of a transparent elastomer layer with surface lines that are based in a left direction. The third layer 820 may be targeted with grid lines or windows that are outlined or colored. In some embodiments, grid lines or targeted windows 830 allow the camera to easily find a certain zone for injection. By sending keystroke data to the processor 604, the camera 120 may be easily rotated and directed toward a target area of injection. The surface lines on the different layers may represent the angled threading of each layer. The angled threading allows light emitted from the testing tool 110 to be reflected in different directions so that the camera 120 may gather visual information about the injection and send it to a processor 604. The processor 604 may then analyze the different angles projected from the testing tool 110 and determine the accuracy of the user's injection.

Figure 9:
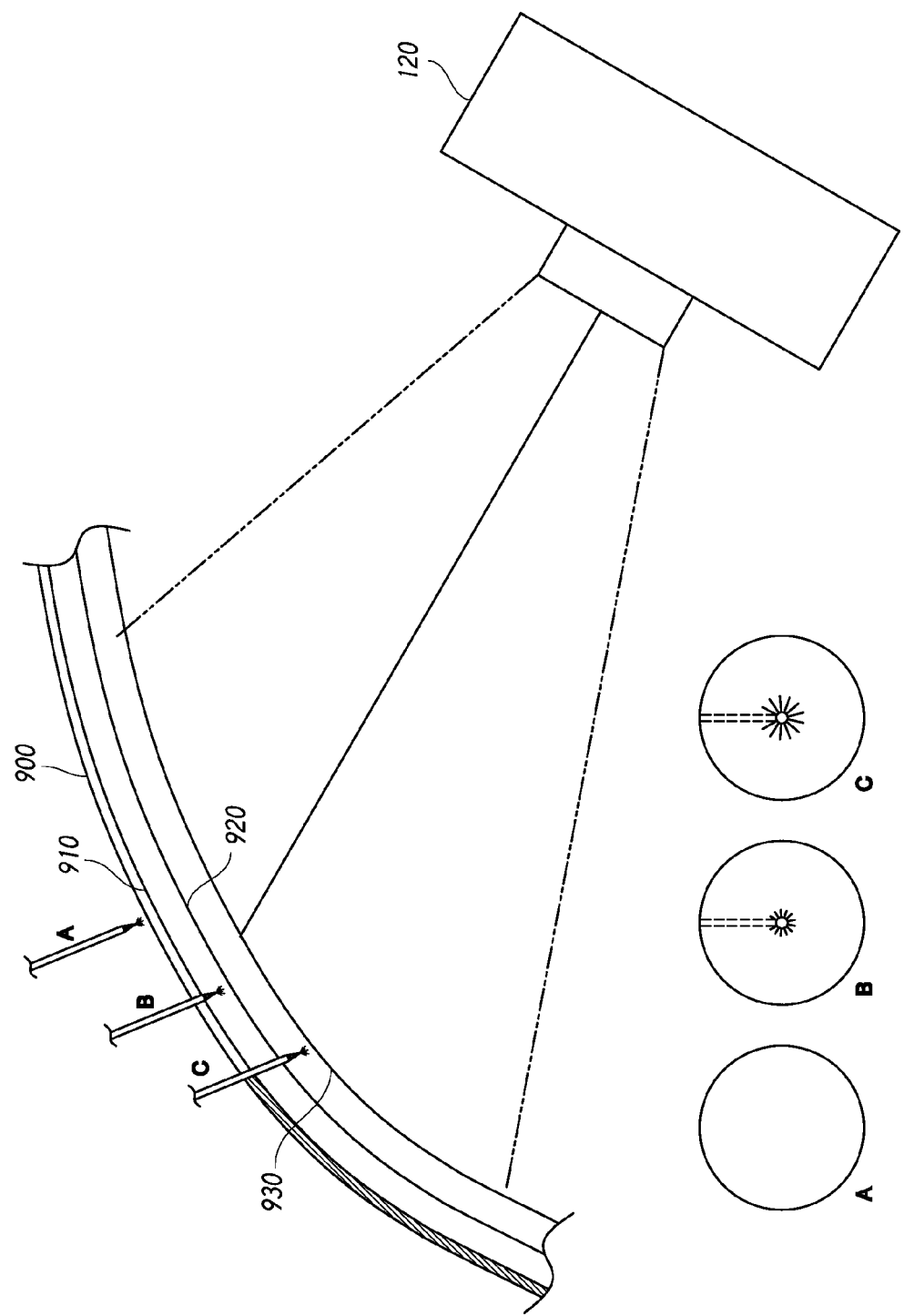
FIG. 9 depicts a cross sectional view of simulated human skin and muscle layers at an injection site.

FIG. 9 depicts a cross sectional view of a top skin layer 900 divided into three separate simulated human skin or muscle layers 900, 910, 920 and being injected by a testing tool A, B, C. The camera 120 may be targeted toward an injection zone of A, B, and C and capture the visual injection through video or photographs. In one embodiment, the testing tool 110 may emit an intensity of light that is attenuated differently as it penetrates different layers of skin or muscle. For example, no light is detected by the camera 120 while the testing tool 110 has not made contact with the skin layer (shown in A). The light detected by the camera 120 when the testing tool 110 reaches the second layer of skin may be a more intense and of a different color in comparison to A (shown in B). The light detected by the camera 120 when the testing tool 110 reaches the third layer of muscle may be the most intense and of a different color in comparison to A and B (shown in C). In some embodiments, an unattenuated light may signal that the user has penetrated through all the layers of skin and muscle and hit the bone of the injection apparatus 100.

In some embodiments, the separate simulated skin or muscle layers may consist of different angled fibers. As a result of these angled fibers, the light emitted from the testing tool 110 may be deflected in different directions. For example, the fibers present in the lowest layer of simulated muscle or skin may be at a 45 degree angle, the second layer of simulated muscle or skin may be at a 60 degree angle, and the top layer of simulated muscle or skin may be at a 75 degree angle. As the camera 120 views the emitted light from the testing tool, it is able to capture information about the injection into the layer of muscle or skin. The output device 140 may receive this information and generate a report determining the depth, pressure, or angle of the user's injection.

Figure 10:
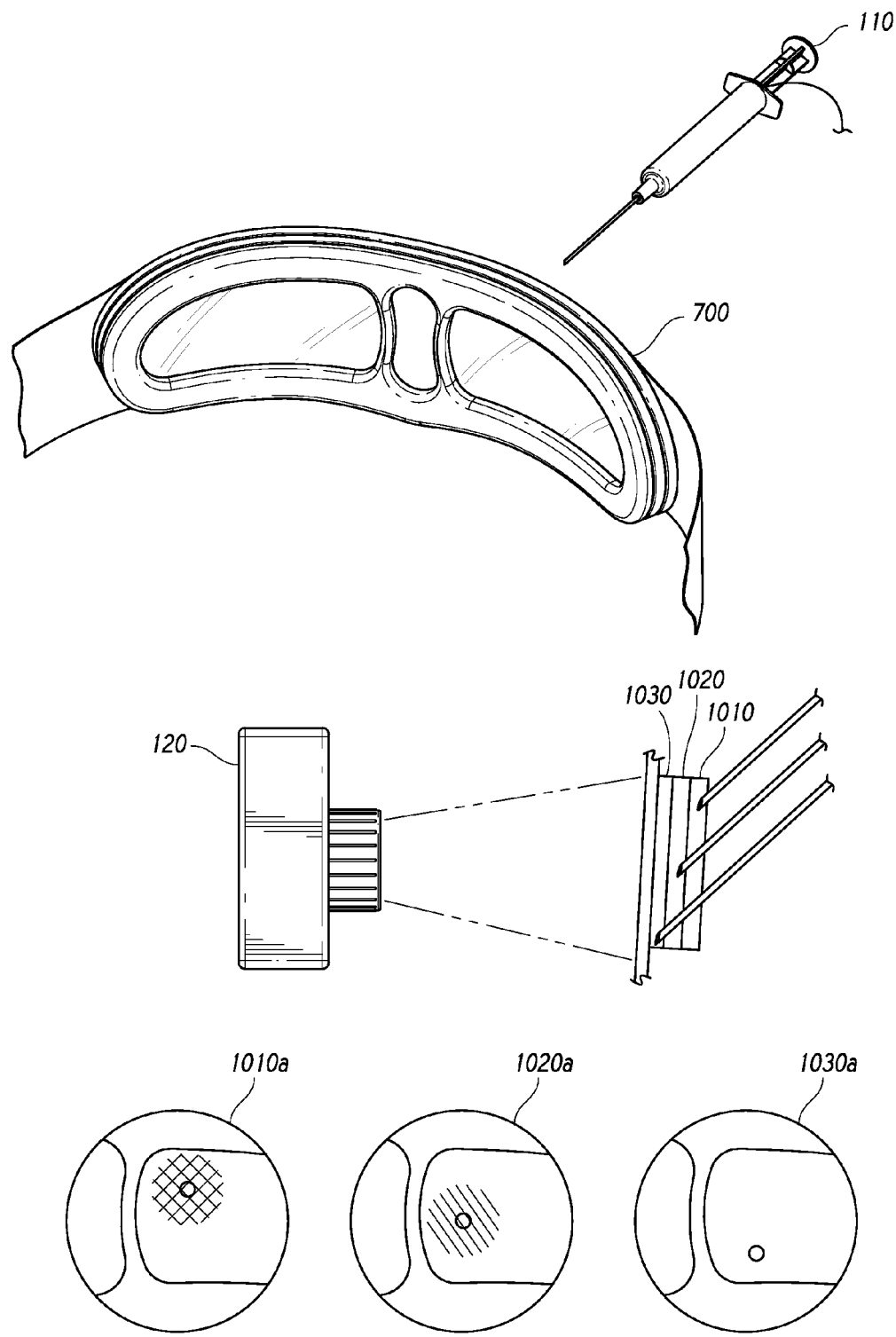
FIG. 10 illustrates the progression of a testing tool being injected into an injection apparatus.

FIG. 10 illustrates the progression of a testing tool 110 being injected into an injection apparatus 100. In this embodiment, the testing tool 110 is shown as being inserted into a removable band 700 with three layers of simulated skin or muscle. Although shown with respect to a removable band embodiment, it is to be understood that this process applies equally to all embodiments disclosed herein. The camera 120 within the injection apparatus 100 can focus on the targeted injection zone. In some embodiments, the camera 120 can record or take pictures of the actual injection and send this information to the processor 604 or output device 140. As the injection is placed within the different layers of simulated skin or muscle, the intensity, angle, color or other visual indication of the light viewed by the camera 120 from the testing tool 110 may change. In other embodiment, other non-visible light attenuation techniques can be used. In some embodiments that have angled threading of the different layers, the camera 120 can capture fewer line directions as the testing tool passes through each layer of simulated skin or muscle. For example, there are multiple line directions displayed when the testing tool 110 is injected into the first layer 1010 of simulated skin or muscle (shown in 1010*a*). There are fewer lines displayed when the testing tool 110 is injected into the second layer 1020 of simulated skin or muscle (shown in 1020*a*). When the testing tool 110 is injected into the deepest layer of simulated skin or muscle, there are no line directions present (shown in 1030*a*). The only visual display to the camera 120 is of the light emitted from the testing tool 110.

FIG. 11 illustrates a front view of an injection apparatus 100 for cosmetic training with cosmetic conditions labeled to corresponding injection sites on a muscle layer 1100. The muscle layer 1100 is available for a trainee to view and study the nerves and muscles of the face, head and neck. In this particular embodiment, common facial aesthetic conditions corresponding to certain muscles are labeled on the injection apparatus 100. In this particular embodiment, the chart 1010 displays the injection units for Botox® corresponding to each injection site. For example, the targeted site 1 corresponds with the targeted muscle, procerus. The trainee is required to inject 20 units of Botox® to remove furrow lines from this area. It may show units or may just show the muscle targeted for injection. This type of visual display of the labeled injection apparatus and the chart 1010 displaying required injection units is available through the user interface for each different condition treated. For example, the user interface may display a different chart for epidural or cardiac injections. The chart 1010 can be a separate paper or it can be displayed graphically on the output device 140 as part of the training system.

Figure 12:
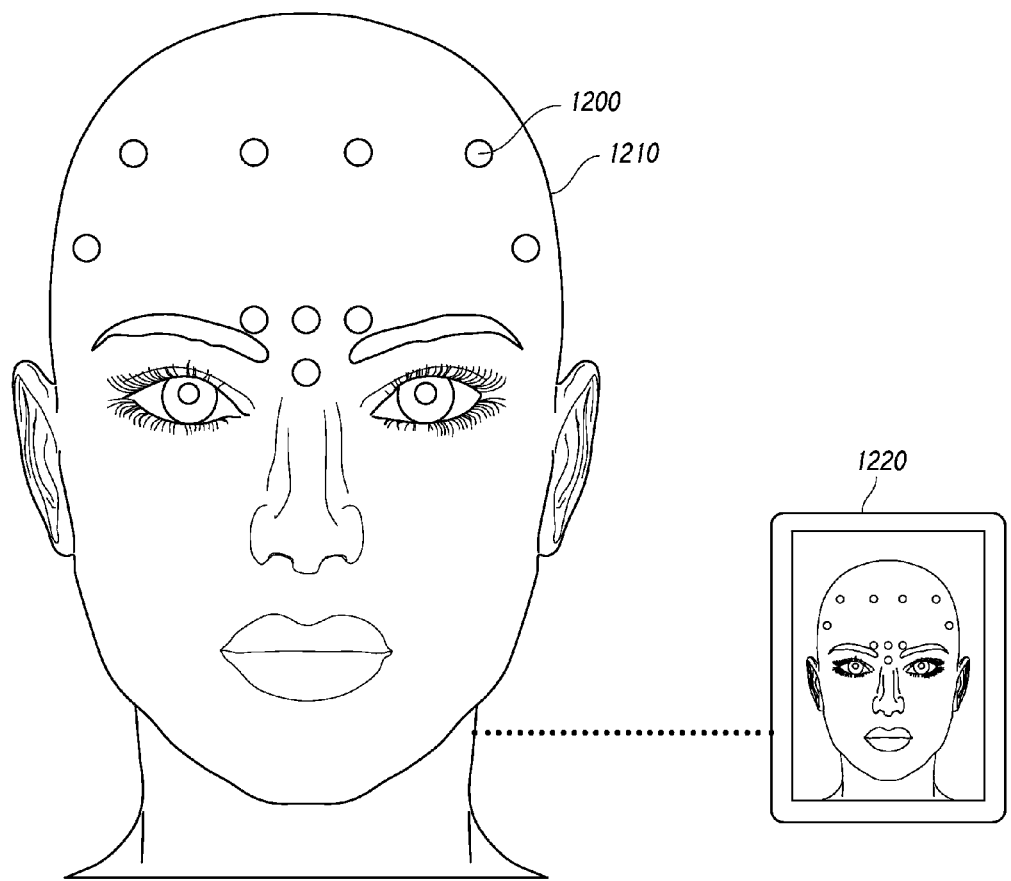
FIG. 12 illustrates an injection apparatus and output display depicting the corresponding image of the injection apparatus.

FIG. 12 illustrates an injection apparatus 100 and output display 1220 depicting the corresponding image of the injection apparatus 100. The skin layer 1210 of the injection apparatus 100 is shown and targeted zones of injection 1200 are labeled on the surface. In some embodiments, the targeted zones of injection 1200 may be different shapes, be distinguished by grid lines, or by color. The injection apparatus 100 receives an injection from a testing tool 110 and a camera 120 captures the visual display of an injection and transfers the information to a processor 604 or the output device 140. The processor 604 or output device 140 then analyzes the visual information and generates an output with detailed information regarding the parameters of the injection. This information is then displayed on the output device 1220. In some embodiments, the output device 1220 may detect information in real time and display injection parameters to a user.

Figure 13:
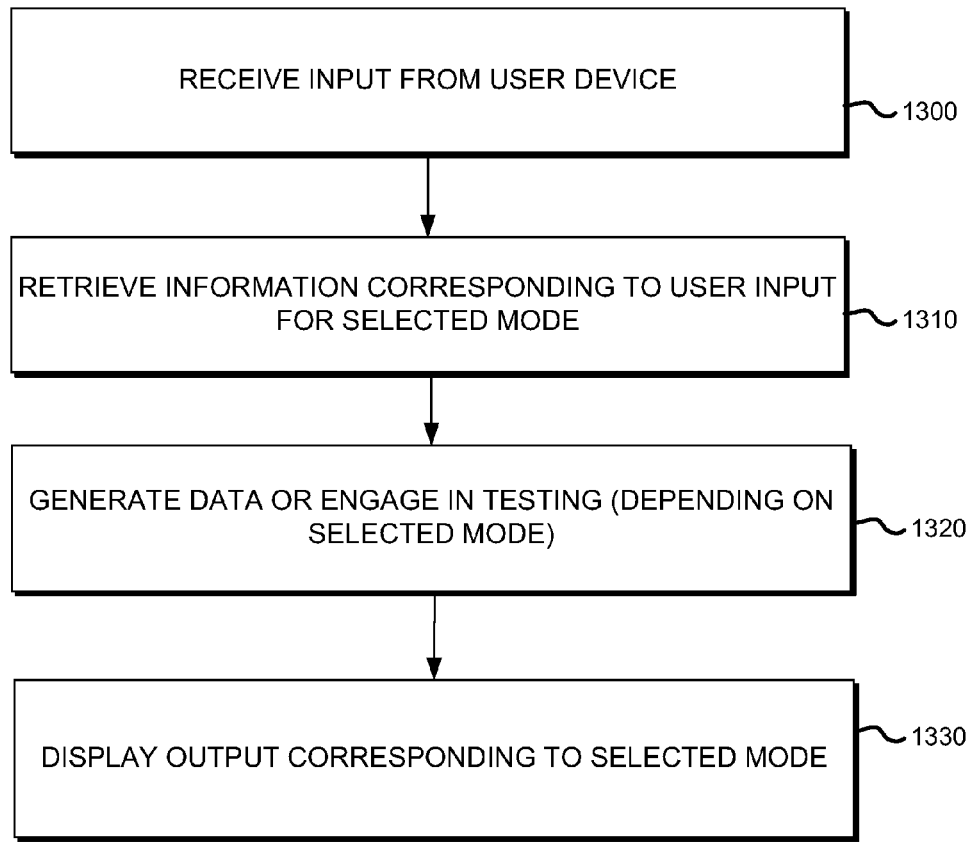
FIG. 13 is a flowchart illustrating an embodiment of a method for utilizing an injection apparatus.

FIG. 13 is a flowchart illustrating one embodiment of a method for utilizing an injection apparatus 100. In block 1300, the output device 140 receives input from the user regarding the action that the user would like to perform on the output device 140. The output device 140 may be programmed to facilitate several program modes. For example, the user may select to enter either the training or testing mode for the output device 140. In block 1310, the output device 140 may communicate with the processor 604 to retrieve stored information from memory 600. This information may include a pre-set injection test for a specific treatment or a display of injection sites for learning purposes. The user may also access information related to previous injection tests for a particular user. In block 1320, the processor 604 can generate data associated with a selected mode. For example, when user selects the training mode, the processor 604 can retrieve information from memory 600 about different types of injections to educate the user. The processor 604 may also receive directions to engage in testing mode. This prompts the processor 604 to activate the camera 120 for injection testing purposes. In block 1330, the output device 140 may display the output corresponding to the selected mode. For example, the output device 140 may display the results of a simulated injection or display feedback on the injection.

Figure 14:
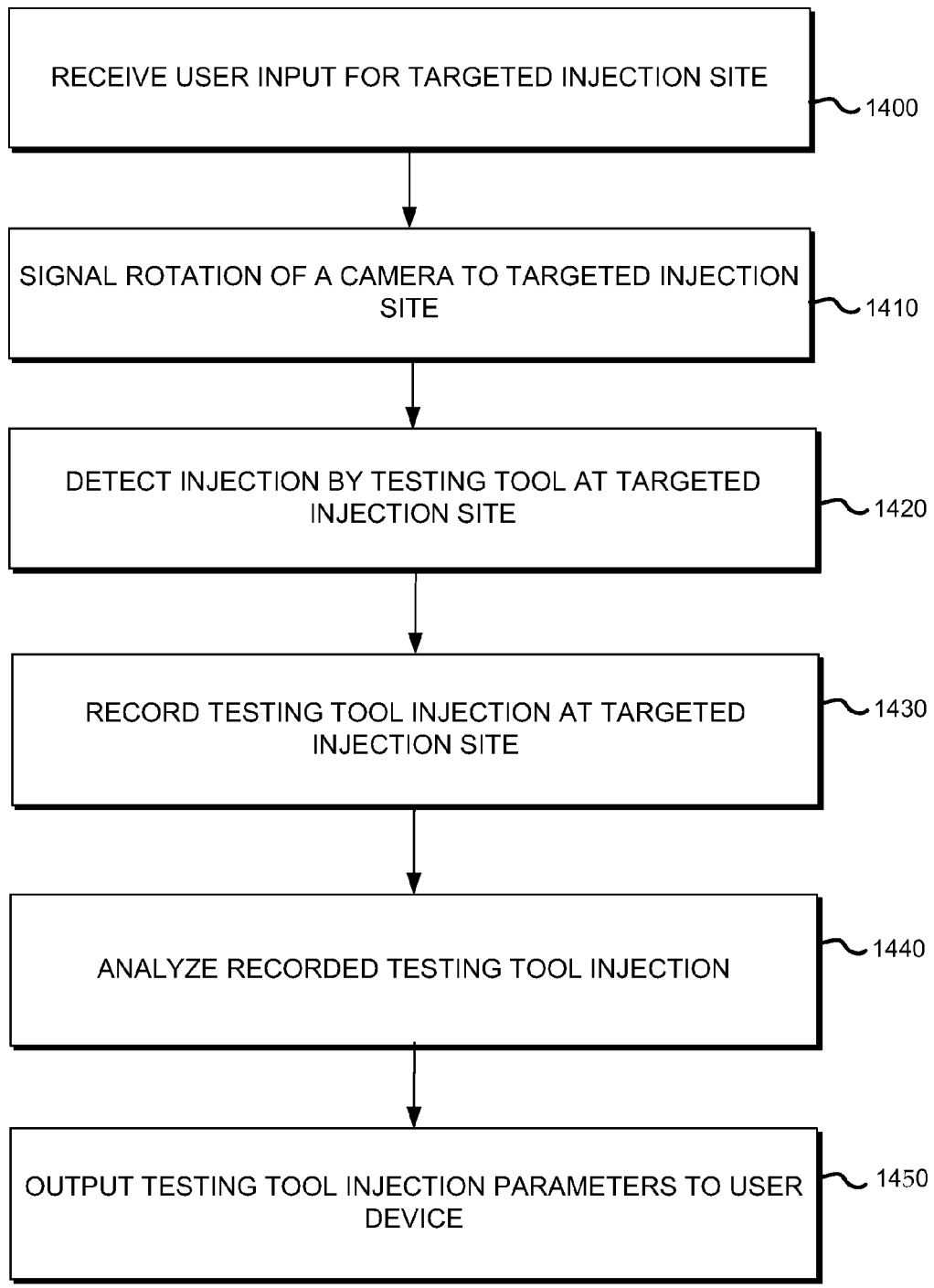
FIG. 14 is a flowchart illustrating an embodiment of a method for utilizing an injection apparatus in a simulated injection test.

FIG. 14 is a flowchart illustrating one embodiment of a method for utilizing an injection apparatus 100 in a simulated injection test. At block 1400, the output device 140 receives user input to perform testing at a targeted injection site. At block 1410, this request is sent to the processor 604 which, in an optional embodiment, sends signals to a camera 120 to rotate to a targeted injection site. At block 1420, an injection performed by a user through a testing tool 110 is detected by a camera 120. Information regarding the injection may be directly communicated by the testing tool 110 through either a cable or a wireless connection to a processor 604. At block 1430, the camera 120 records either a video or captures a photograph of the injection at the targeted injection site. At block 1440, the video or photograph is analyzed by the processor 604. The processor 604 is able to determine one or more injection parameters, such as, for example, the angle, depth, pressure, and location of the injection. At block 1450, the injection parameters analyzed by the processor 604 is displayed on a output device 140.

Figure 15:
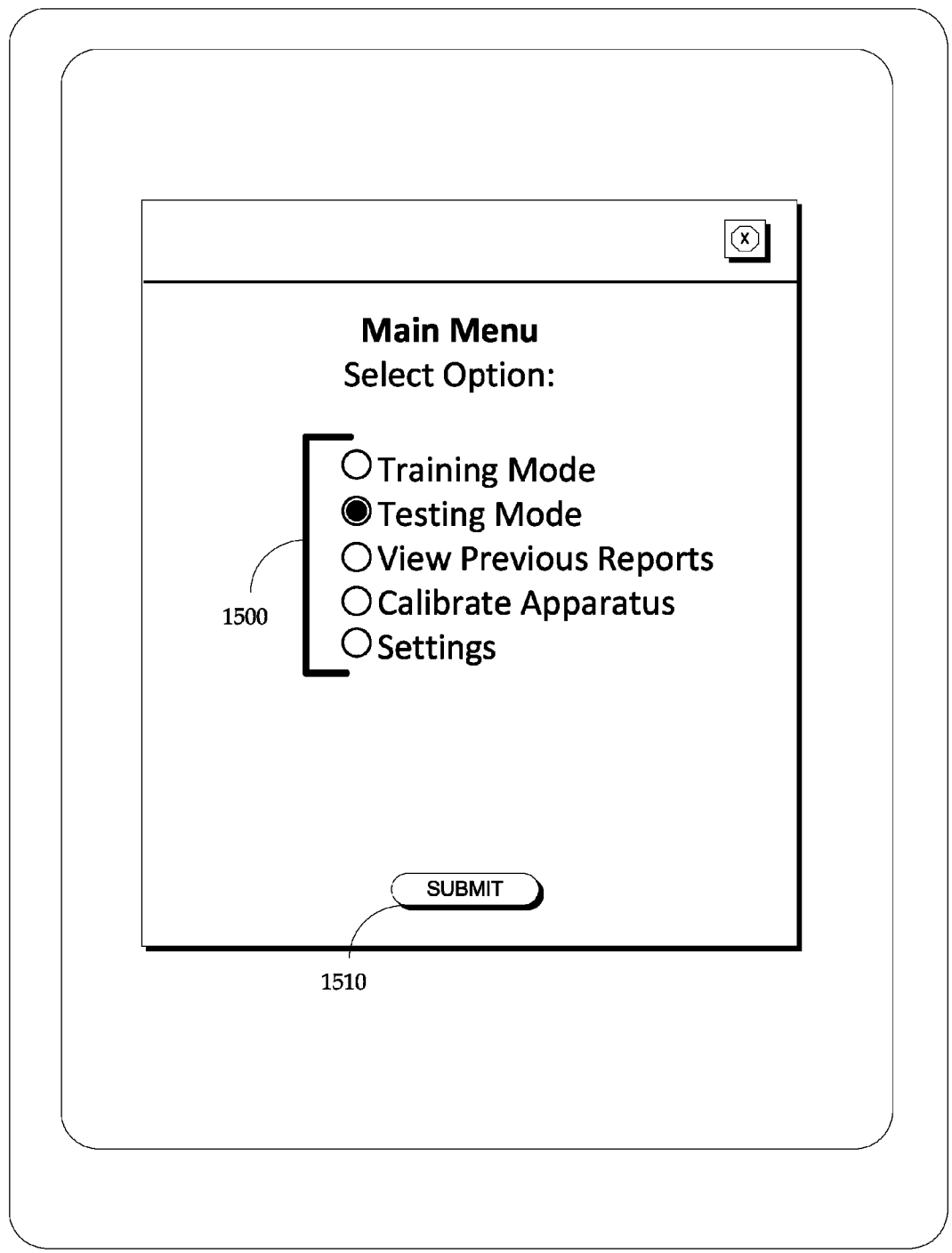
FIG. 15 illustrates a user interface for injection training through an injection apparatus.

FIG. 15 illustrates a user interface for injection training through an injection apparatus 100. The main menu of the user interface allows a user to select different modes of operation (e.g., training mode, testing mode) and different features (e.g., view previous reports, settings). The main menu also allows the user to calibrate the injection apparatus 100. Once the user has selected an option from the main menu, the user selects the submit button 1510 and proceeds to another display of the user interface.

In order to maintain the overall performance of the injection apparatus 100 in conjunction with the testing tool 110 and camera 120, a calibration device can be provided that will check the accuracy of the testing tool 110 with respect to the camera output. This may be completed either automatically after a set number of injections or manually when requested by a user. In some embodiments, the accuracy of the testing tool 110 may be calibrated to have a better than about 0.5 mm precision.

Figure 16:
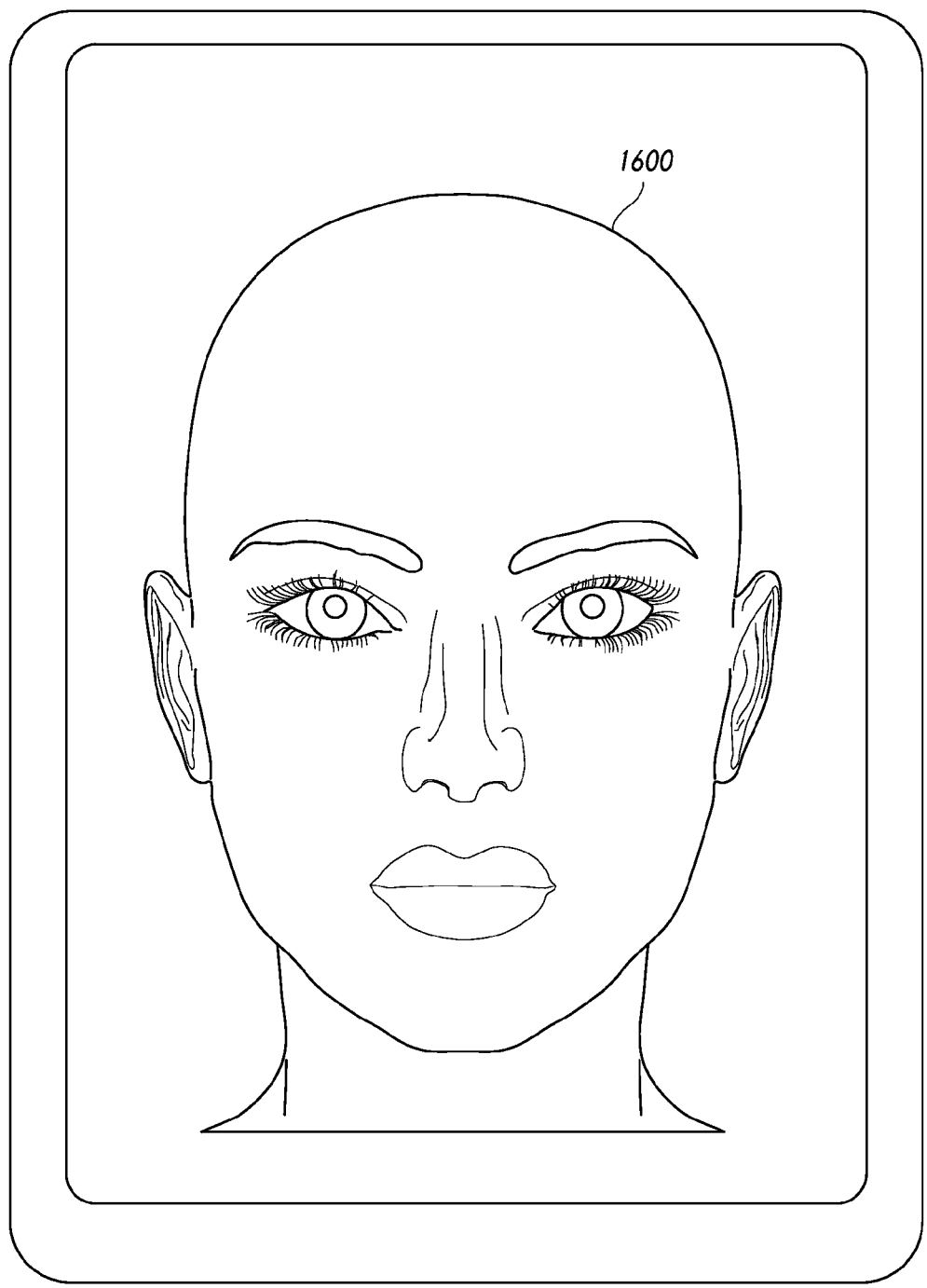
FIG. 16 illustrates an injection apparatus for prophylactic, curative, therapeutic, or cosmetic training with a skin layer displayed.

FIG. 16 illustrates an injection apparatus with a skin layer displayed. In some embodiments, the output device displays this information to allow the trainee and trainer to view the ideal injections for each skin layer site. In some embodiments, the skin layer may be color coded and the different sections of the skin may be removable or replaceable. For example, the skin layer may be sectioned into different target zones so that a user may remove the skin layer of a targeted zone and observe the injection results into the muscle layer of the training apparatus 100.

Figure 17:
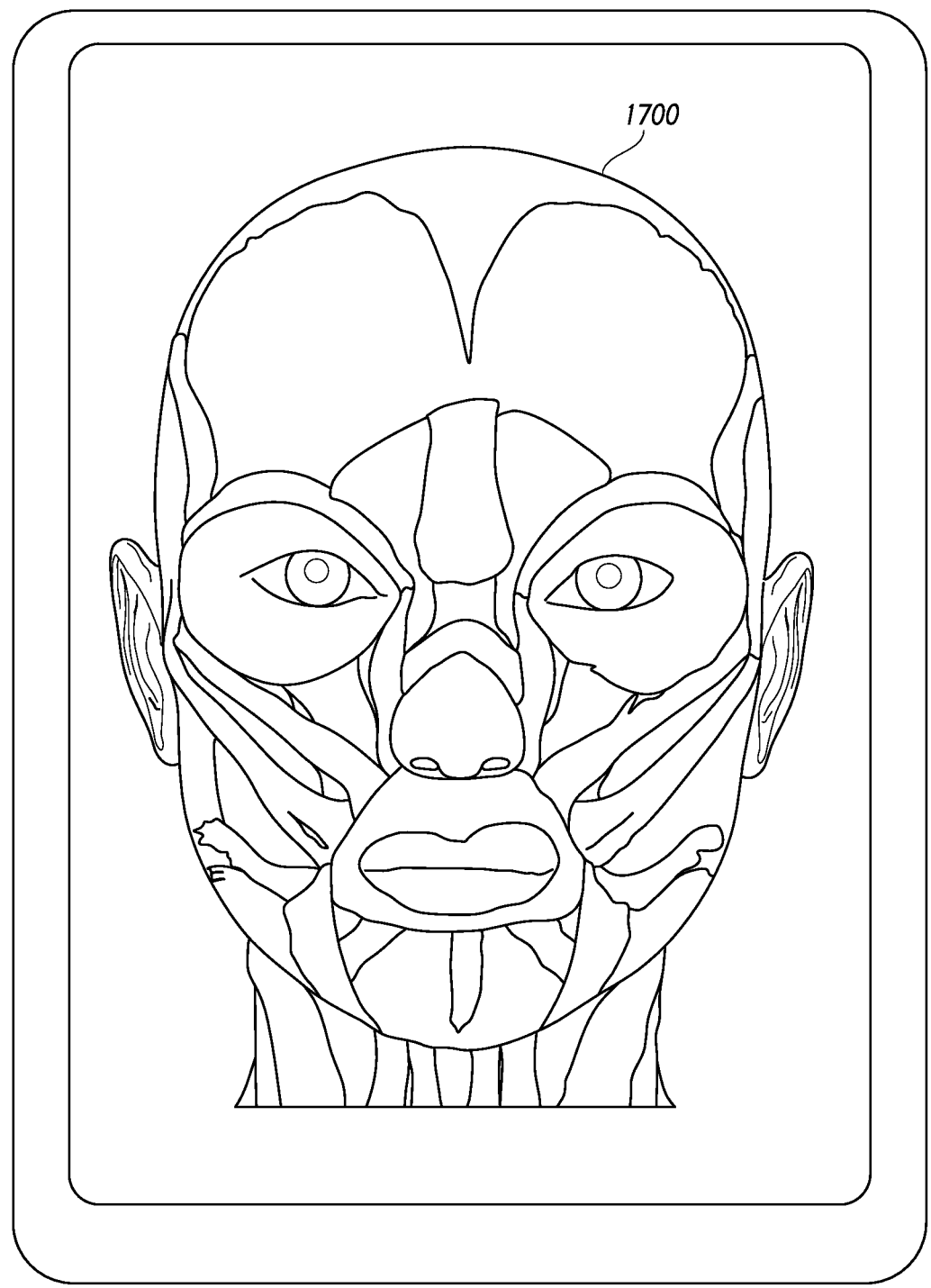
FIG. 17 illustrates an injection apparatus for therapeutic neuromodulation training with the muscle layer displayed.

FIG. 17 illustrates an injection apparatus 100 for therapeutic neuromodulation training with the muscle layer 1400 displayed. Injection sites are marked on the front view of the injection apparatus 100. In some embodiments, the injection sites may be color coded to allow the user to visualize targeted muscles.

The output device 140 may allow the user to rotate the display presented between landscape and portrait views. The injection apparatus 100 may also be physically rotated and this rotation may be detected by the processor 604, which then sends a signal to the output device 140 to rotate the image displayed. The output device 140 may receive communications sent from a testing tool 110 to the processor 604 regarding this change in direction of the injection apparatus 100 and display the change accordingly. In an embodiment, the image displayed is a three dimensional image. In another embodiment, two dimensional images are displayed.

Figure 18:
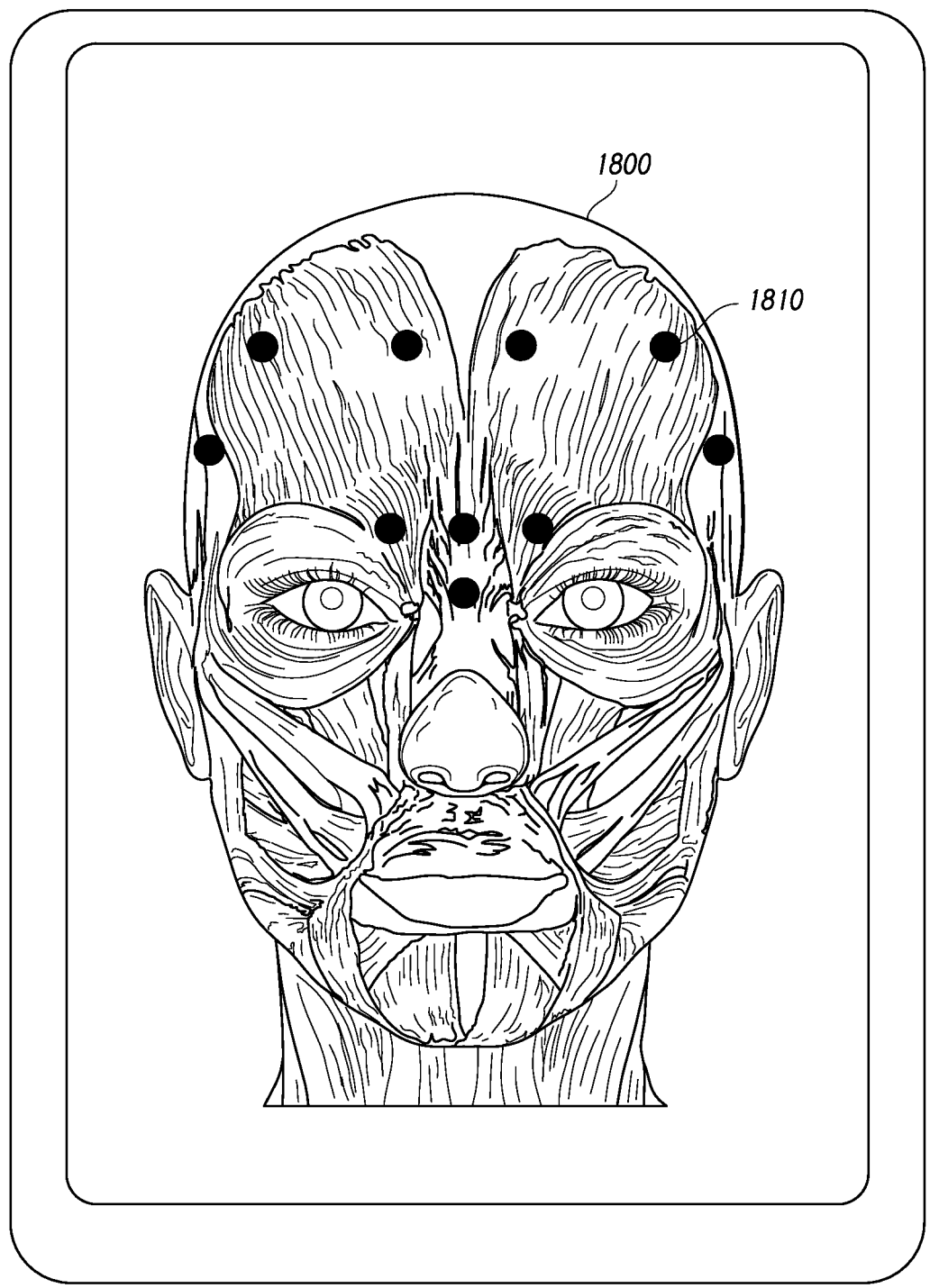
FIG. 18 illustrates an injection apparatus for injection training with injection sites displayed on a muscle layer.

FIG. 18 illustrates a output device 140 display of an injection apparatus 100 for injection training with injection sites displayed on a muscle layer. The injection sites 1810 depicted on this embodiment of the injection apparatus include injection sites 1810 which correspond to those locations targeting neuromodulation or cosmetic treatments, including, for example, fillers. Some filler injection sites may include the forehead, temples, brows, superior sulcus, nose, tear troughs, lateral cheeks, medial cheeks, submalar area/bucal fat pad, malar groove, nasal labial folds, pre-auricular fossa, lateral mandible, pre-jowl sulcus, chin, lips, ears, marionette lines, fine lines throughout the face, neckless lines or vertical lip lines. In some embodiments, these injection sites 1810 can be located at different areas on the body that target the brain or nervous system. The treatments may include those related to gastric disorders, Parkinson's disease, or urologic disorders. These therapeutic conditions are not solely related to resulting neuromodulation or cosmetic conditions, but may be a combination of other conditions, such as nerve conditions or other physical problems.

Figure 19:
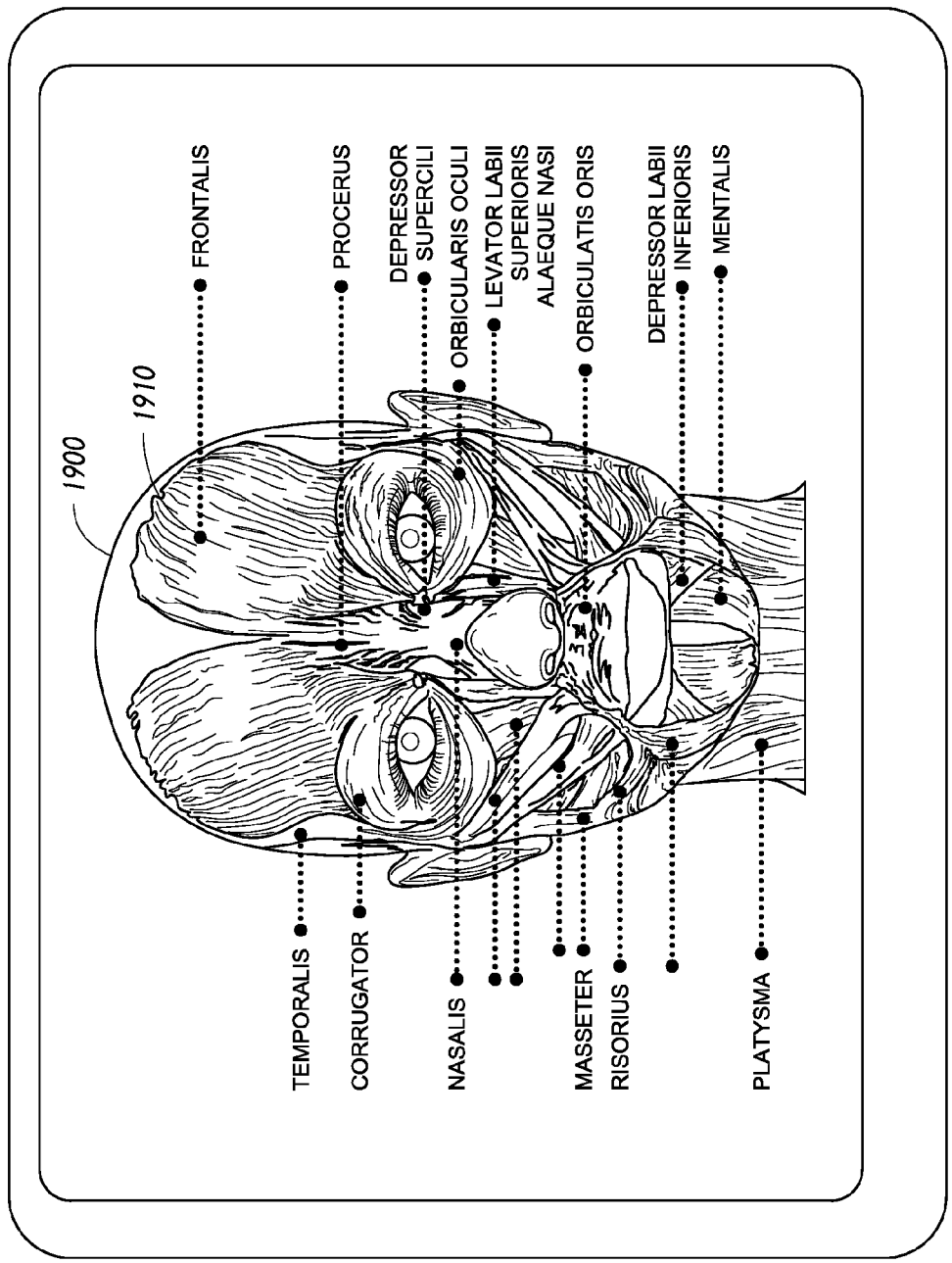
FIG. 19 illustrates an injection apparatus for injection training with a muscle layer displayed and labeled.

FIG. 19 illustrates a output device 140 display of an injection apparatus 100 for injection training with a muscle layer 1900 displayed. The injection sites 1910 are labeled according to their muscle name. In some embodiments, the displayed injection apparatus 100 may have different muscles illustrated with different colors. This allows the trainee to easily visualize the locations of each muscle as well as how big the muscle may be with respect to the rest of the human face. A user is able to access displays for different treatments with targeted muscles or areas of injections highlighted or marked for the user's reference. This display may be seen by a user at the end of a simulated injection testing so that the user may learn from any errors that were made during the simulation.

Figure 20:
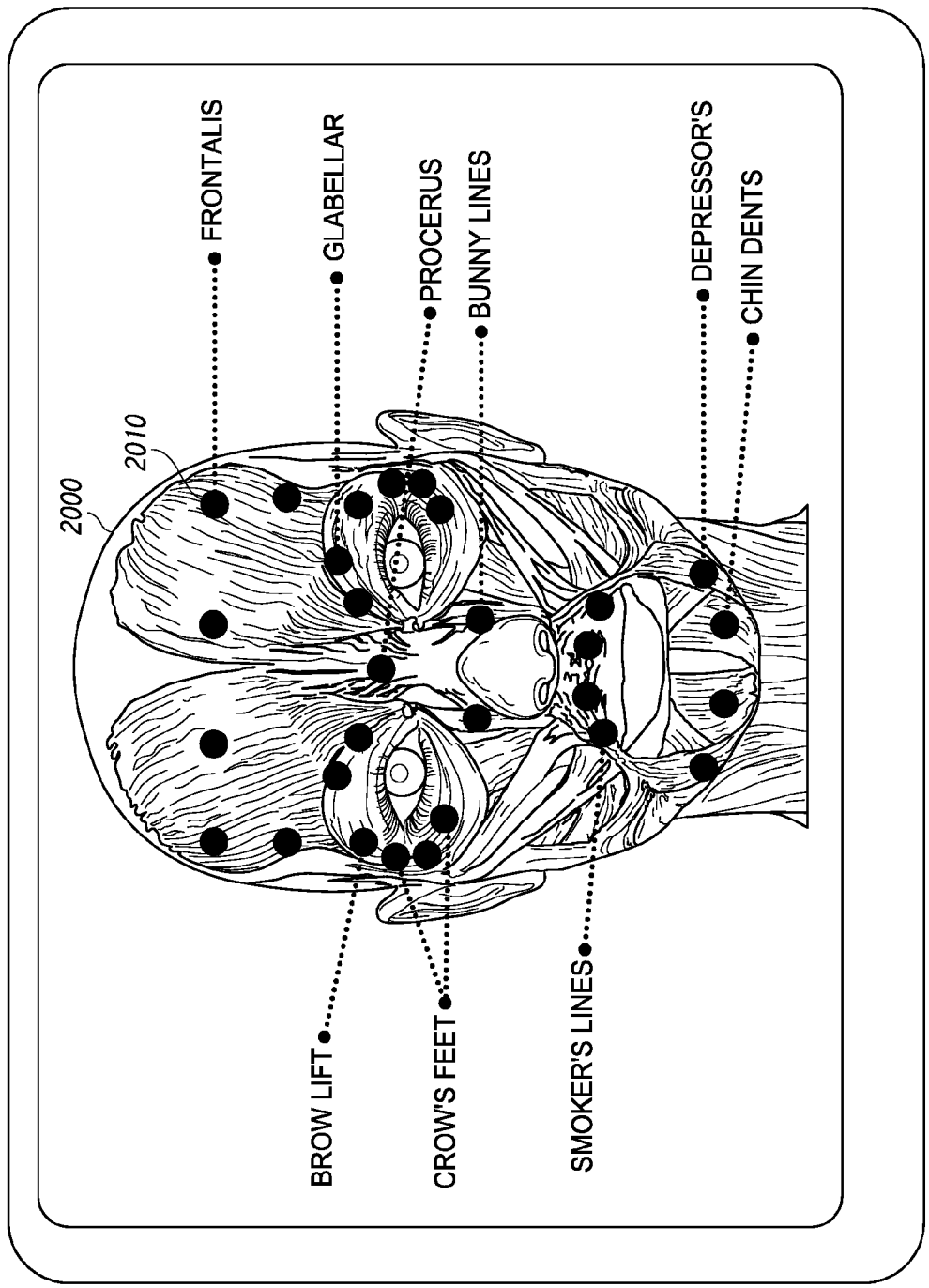
FIG. 20 illustrates an injection apparatus for injection training with a muscle layer display and labeled with cosmetic flaws.

FIG. 20 illustrates a output device 140 display of an injection apparatus 100 with a muscle layer 2000 displayed and labeled. The injection sites 2010 are labeled according to the corresponding cosmetic flaws. In some embodiments, the injection apparatus 100 displayed on the output device 140 may show different conditions needed for treatment. For example, the output device 140 may display areas needing injections for treating cardiac conditions on a heart. In an embodiment, the output device 140 is equipped with multilingual capabilities and a user can select a language from menu settings to be used by the output device 140.

Figure 21:
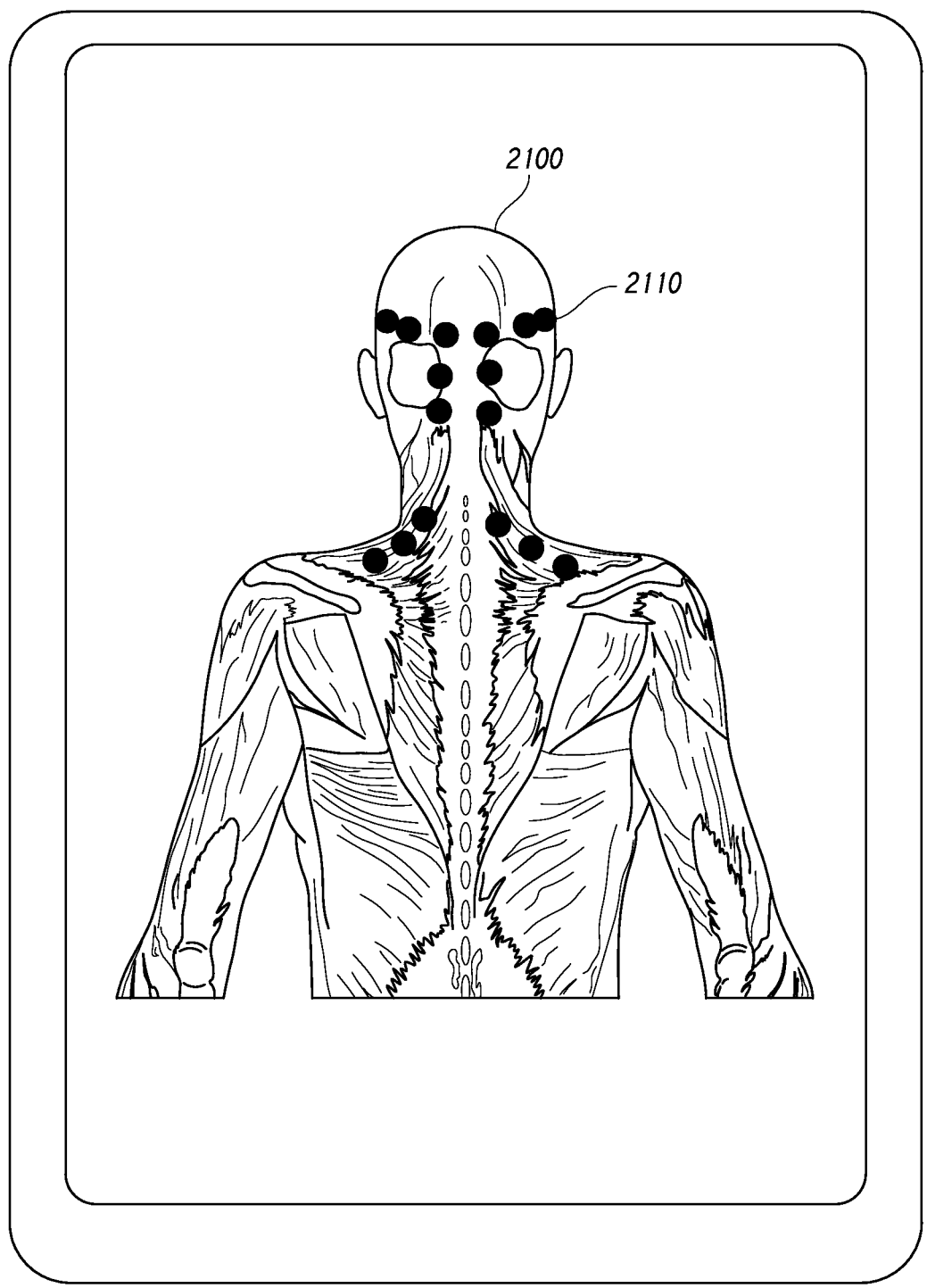
FIG. 21 illustrates the back view of an injection apparatus for therapeutic neuromodulation training with a human face, head, neck and upper torso.

FIG. 21 illustrates the back view of an injection apparatus 100 for therapeutic neuromodulation training 2100 with a human head, neck and upper torso. These injection sites 2110 correspond to locations targeting neuromodulation treatments. The injection sites 2110 may be physically marked on the injection apparatus 100 or only shown on the output device 140. The injection sites 2110 may be presented in different shapes and allow a camera placed within the injection apparatus 100 to focus in on a targeted zone for different treatments. For example, the injection apparatus 100 may simulate the back of a human for epidural injections. The training apparatus may also simulate different organs of the human body, such as the heart, brain, or liver. In one embodiment, the training apparatus may be covered in different layers of material for detecting an injection.

Figure 22A:
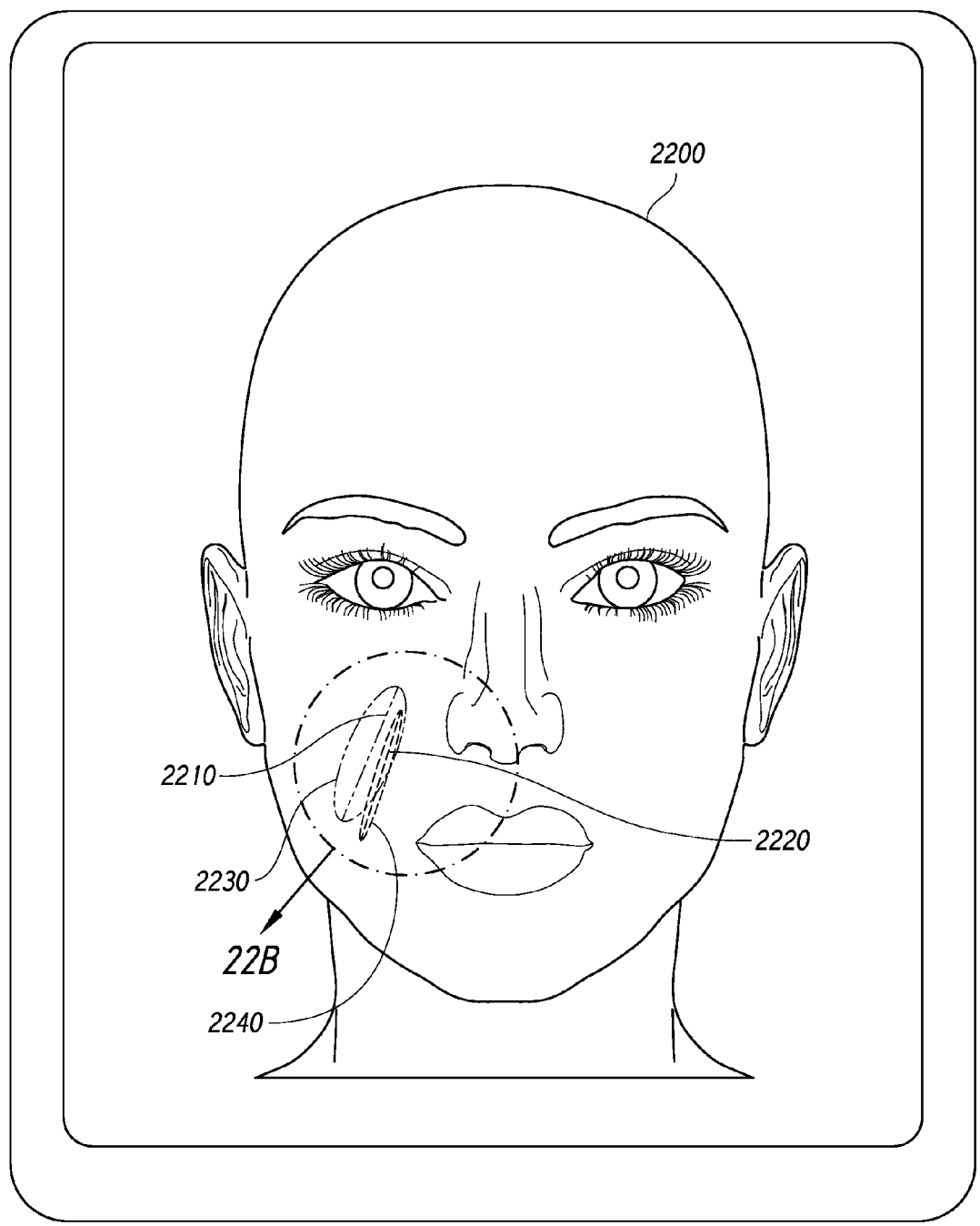
FIG. 22A illustrates the display of a mapped dermal filler injection and one embodiment of scoring the injection.

FIG. 22A illustrates the display of a mapped dermal filler injection and one embodiment of scoring the injection. As an injector is performing a simulated injection, the output device 140 can provide real-time display of the desired and actual injection paths and dispersion volumes. For example, the output device 140 can show the target path for a dermal filler 2210 and the actual path of the injection 2220 performed by the injector. The output device 140 can also show the target volume 2230 along a needle path and the actual volume 2240 of the injection. In some embodiments, the output device 140 may display other parameters associated with the injection, such as the location of the needle 212 when it is inserted into the injection apparatus 100, the force of the injection, or the angle of the injection.

Figure 22B:
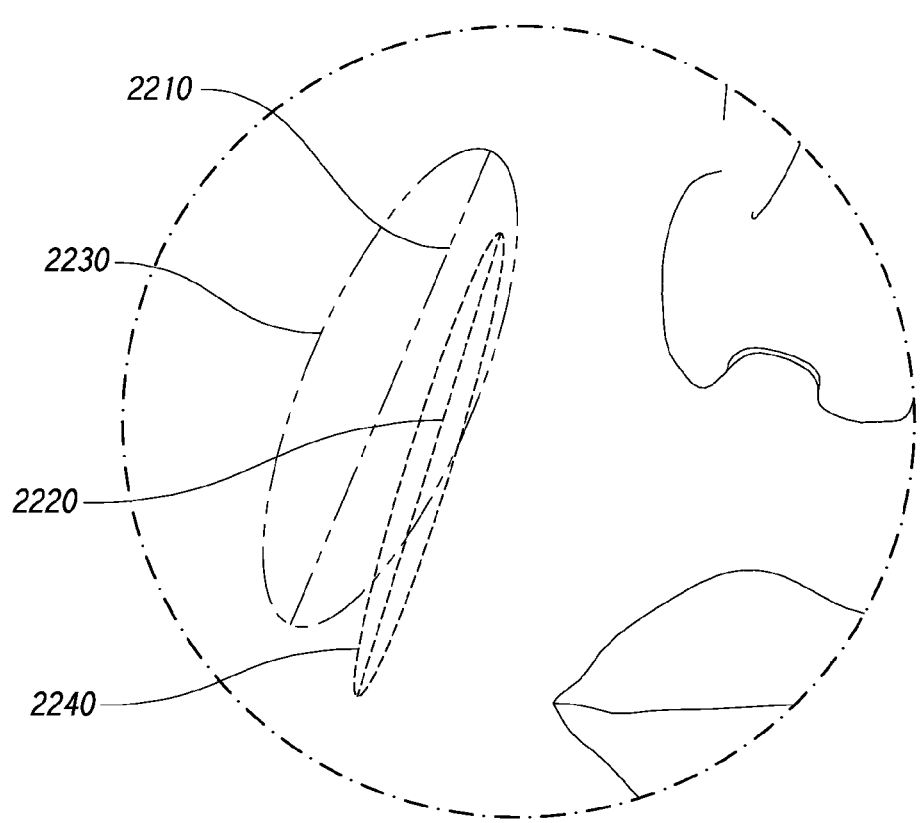
FIG. 22B illustrates the expanded view of a mapped dermal filler injection.

FIG. 22B illustrates the expanded view of a mapped dermal filler injection of FIG. 22A. In some embodiments, the camera 120 detects the actual path of the injection 2220. The various paths and injection points may be displayed in various colors. The actual volume injected into the injection apparatus 100 may be calculated by measuring the position of the testing tool plunger 209. The position and volume accuracy may be calculated and displayed by the output device 140.

Figure 23:
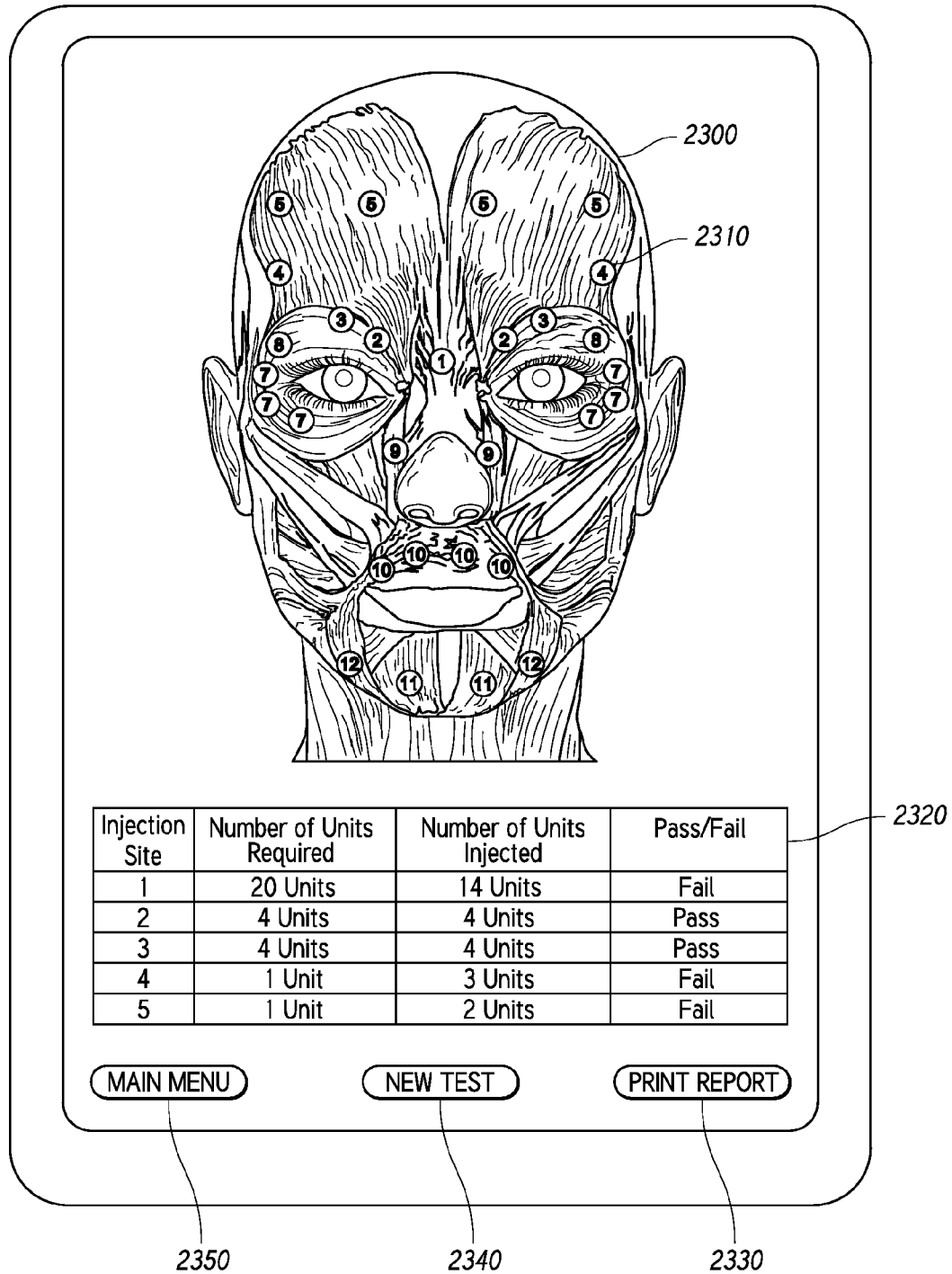
FIG. 23 depicts a resulting output of an injection test on an output device.

FIG. 23 depicts a resulting output of an injection test on the output device 140. The displayed apparatus 2200 has the muscle layer shown and injection sites 2210. The process for displaying the output of the testing results begins with the output device 140 receiving instructions to simulate a pre-set cosmetic condition or therapeutic treatment. In one embodiment, a user has the option to input requirements for a specific injection. The individual being tested or trained can then prepare the testing tool 110 with the injection product that corresponds to the cosmetic condition or therapeutic treatment. By utilizing the camera 120 stored within the injection apparatus 100, the 3D coordinates of an injection can be determined based on position and intensity of the attenuated detected light received from the testing tool 110 and/or in conjunction with location markings as described above. The processor 604 or output device 140 may receive a wired or wireless signal detection of the 3D location, pressure, and angle of the injection on the injection apparatus 100. The 3D coordinates of the testing tool can be used to evaluate the accuracy of the injection.

The results are displayed in a chart 2220 that informs a user or operator of an injector's performance. The output device 140 or software application reports the parameters of the injection collected from the testing tool 110 or camera 120. In some embodiments, the output device 140 and/or software application provides feedback on the results. For example, the feedback may include whether the injection was made in the correct location, the depth of the injection, and areas in which the injection could have been improved. In one embodiment, the feedback may include whether a user passed or failed an injection test corresponding to a cosmetic condition or therapeutic treatment. The results may also be in the form of a score, accuracy rating, or an overall rating.

In this particular example of FIG. 23, the user failed the injection standard at injection sites 1, 4, and 5 and passed the injection standards at injection sites 2 and 3. The user may choose to view the results in only the chart form or with indicators displayed on the injection apparatus shown on the output device 140. For example, the indicators may be Xs or Os showing the accurate or inaccurate injections.

After completing the injection test, the user may select a different view of the injection apparatus 100 or choose to enter a learning mode from the main menu 2250. The user has the option of starting over by pressing the new test button 2240 or printing the report 2230. The user interface provides the user or operator with the option of saving the injector's results into the software program for later access.

The test data and other data collected by the devices and systems of the present disclosure can also be analyzed using data analytics. For example, data analytics software can analyze data or information collected from and associated with patients and injectors who use the injection apparatus 100. This data can be collected from a large number of patients and injectors and compiled for analysis, or data can be collected and analyzed separately for each patient or injector. The data can be stored in an electronic storage device local to the injector or at a remote location. In an embodiment, the injection records can be associated with or collected from electronic medical records (EMR). In an embodiment, the data associated with a patient or injector may be accessible by linking the individual's information with a fingerprint or username and password. The fingerprint may be read by a biometric sensor. In some embodiments, an injector may access his or her progress when performing injections on any injection apparatus and each training or test result may be stored. In some embodiments, the patient will have a compilation of all their medical information stored in a database that can be retrieved once their profile is accessed on a output device 140. The information may include personal information, medical history, and types of procedures which have been performed on the patient, which, for example, can be stored in the form of an EMR. Injectors who use the injection apparatus 100 may include those who are certified, are in the process of being certified, doctors, nurses, or other medical practitioners.

The software may keep track of an injector's progress of injections performed on the injection apparatus. Based on the injector's performance, there may be a score, rating or ranking calculated and presented to a user requesting information on the injector. The score, rating or ranking provides an indication of an accuracy of the injections performed, an estimated skill level of the injector, an indication of the experience of the injector or the number of injections performed, or any other measure indicative of the quality of the injector. A separate score or ranking may be available for different types of injections or injection locations. For example, a user searching for an injector experienced in treating crow's feet may pull up a list of injectors in a geographic area. The injectors may be listed by ranking, rating or score based on one or more of education, years of experience, performance results with the injection apparatus, or patient reviews. The data can also be collected from multiple patients or injectors and analyzed to determine a bulk average. This can be used to determine the effectiveness of a treatment or the risks associated with treatment.

Figure 24:
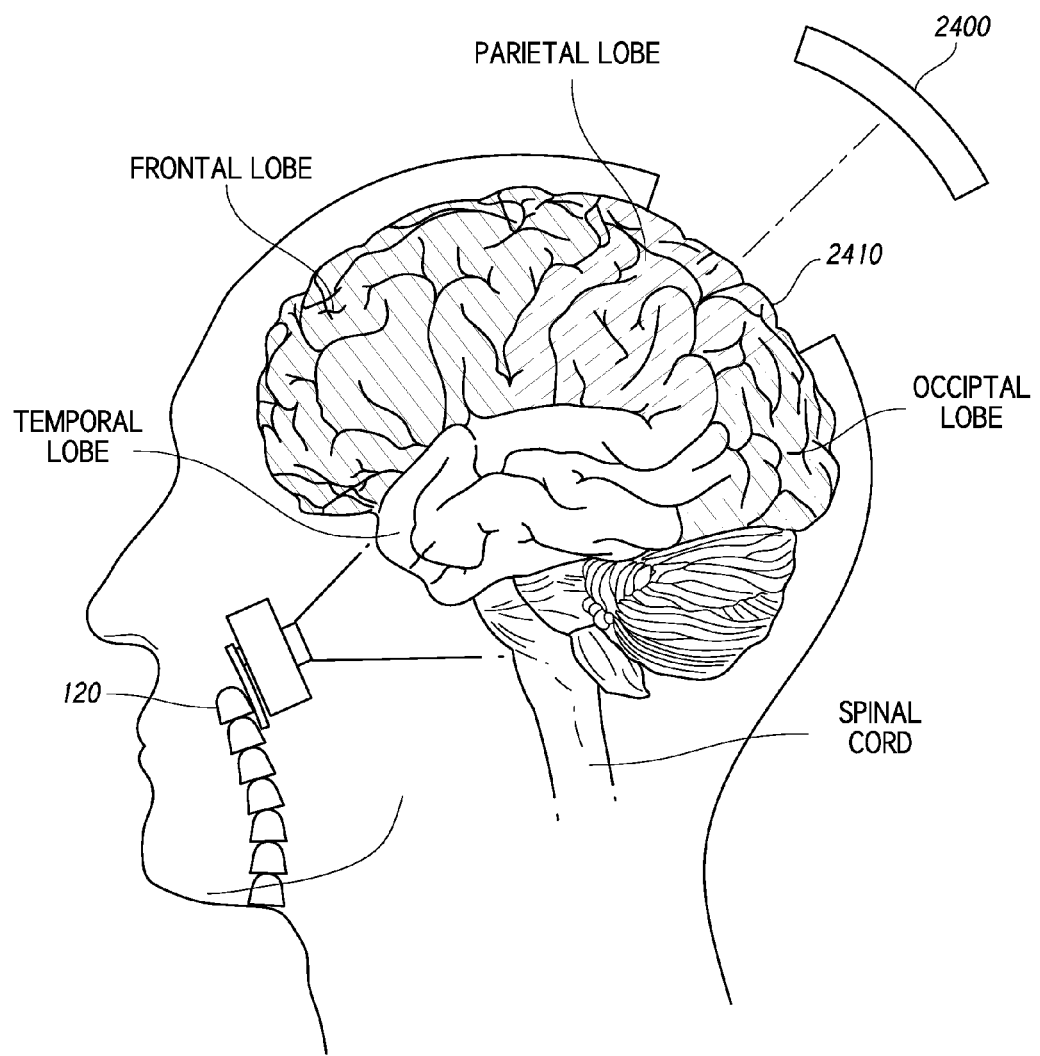
FIG. 24 illustrates an injection apparatus for injection or open brain surgery training with a human brain displayed and labeled.

FIG. 24 depicts an injection apparatus 100 for injection or open brain surgery training with a simulated human (or animal) brain 2410 displayed and labeled. In some embodiments, an injector is able to practice brain surgeries requiring removal of skin and bone. For example, an injector may perform a craniotomy, where the bone flap is temporarily removed and then replaced after brain surgery. Craniotomy procedures may be performed for brain tumors, aneurysms, blood clots, removing arteriovenous malformation, draining brain abscess, repairing skull fractures, repairing tears in the brain lining, relieving brain pressure, or epilepsy. In performing simulated open brain surgery training, the injector may surgically remove a portion of the skin, muscle, or skeletal layers 2400 of the injection apparatus 100. The different portions of the simulated human brain 2410 may be color coded or have varying densities. Different colors, directions, or intensities of light can be captured by the camera 120 as the testing tool 110 is injected through the different sections of the human brain 2410. The injector also may remove a portion of the human brain 2410 in order to simulate performing a biopsy.

In some embodiments, the testing tool 110 may be a scalpel or other equipment used for incisions. The resulting colors, directions, intensities or other visual effects of light detected by the camera 120 represent the location, differences in pressure exerted by the user, angle of injection, or the depth of the injection. This information can be detected, for example by a camera 120, and communicated to a user interface device 140 for testing or certification purposes. The camera 120 may be an endoscope so it may fit within the simulated human brain 2410 or other simulated organs which may not be capable of containing a bigger camera 120. An endoscope may be used for training procedures on other organs, such as the bladder, ureters, or kidneys. The camera 120 is able to detect the size and location of the portion which is removed from the injection apparatus 110. Alternatively, only a portion of the body part is provided and an opposing portion is left open so that a camera can be positioned to detect the testing tool. For example, in FIG. 23, the fact can be left open so that a camera can be positioned to view the opposite side of the brain from an injection or treatment site.

At the end of the simulated operation, the injector or therapist may return the removed portion of the skin, muscle, or skeletal layers 2400 into the simulated human brain 2410. This can be accomplished by attaching the skin incision to the injection apparatus 110 with sutures or surgical staples.

In some embodiments, the injection apparatus 100 may be used in connection with non-invasive or minimally invasive surgical techniques which do not require incisions or do not require large incisions. For example, an injector may be able to perform a simulated brain surgery with radiation, where a high dose of radiation is applied to problematic nerves. This does not require the injector to open up the injection apparatus 100 to view the simulated human brain 2410, but still allows the injector to practice this technique by using the output device 140 to view the simulated human brain 2410.

Figure 25:
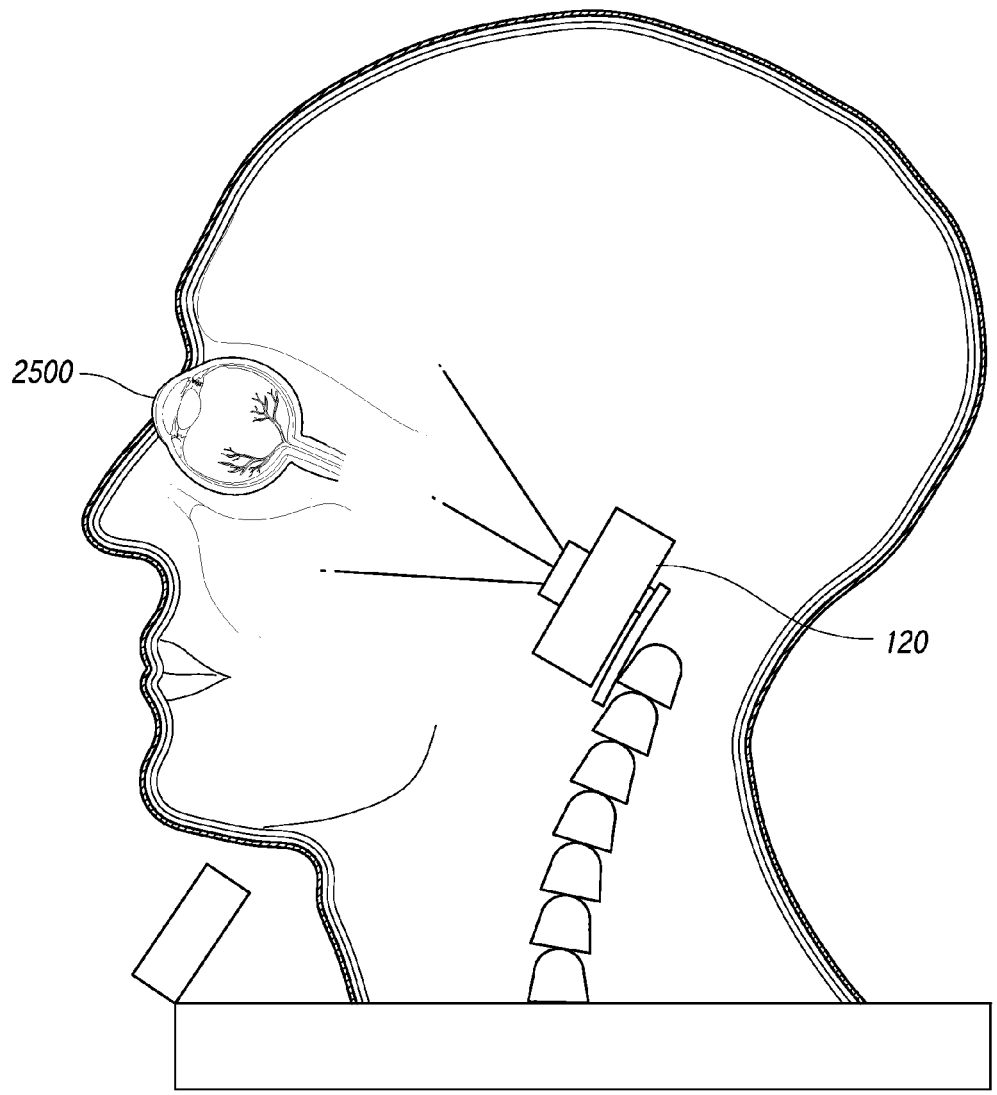
FIG. 25 illustrates an injection apparatus for injection or eye surgery training with a human eye displayed.

FIG. 25 depicts an injection apparatus for injection or eye surgery training with a human eye 2500 displayed. The injection apparatus may be used for therapeutic eye treatment, such as age-related macular degeneration. Injectors may perform anti-vascular endothelial growth factor injection therapy on the simulated human eye 2500. In some embodiments, the injector may be required to numb the simulated human eye 2500 and clean it with antiseptics as part of the training procedure. Other procedures may include performing cataract surgery, glaucoma surgery, intravitreal Kenalog injections, or canaloplasty.

In some embodiments, the camera 120 may be placed within the injection apparatus and focused on the simulated human eye 2500. The camera 120 may also be an endoscope that captures the administered injection or surgical procedure. In some embodiments, the coats or sections of the eye may be have a different color or density. For example, fibrous tunic may be opaque, the vascular tunic or uvea may be tinted, and the retina may be clear. Once an injection is placed by the injector into the eye, the camera 120 may detect the parameters of the injection.

Figure 26:
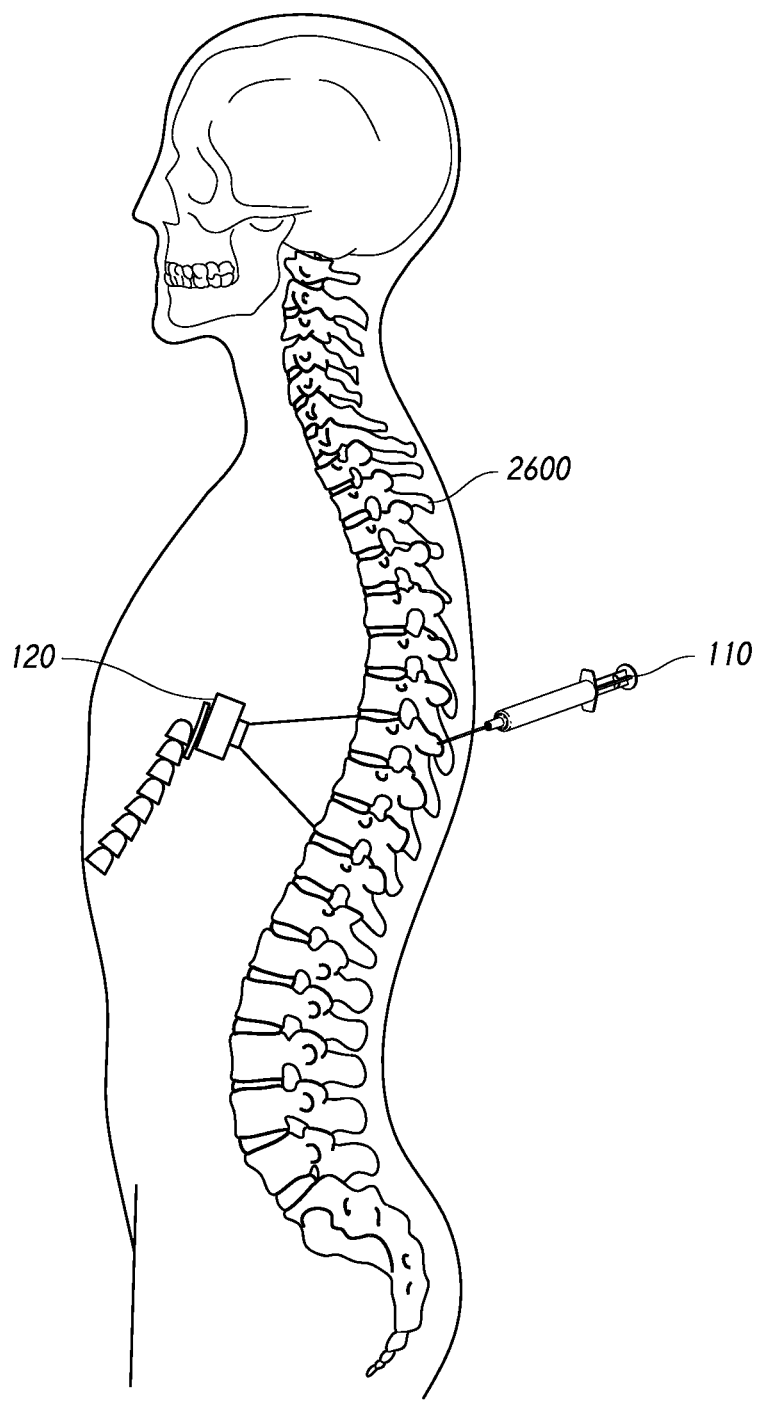
FIG. 26 illustrates an injection apparatus for injection or spinal surgery training with a human spine displayed.

FIG. 26 illustrates an injection apparatus for injection or spinal surgery training with a human spine 2600 displayed. The camera 120 may be placed within the injection apparatus 100 so that it is may move and focus on specific sections of the human spine 2600. The injection apparatus may be used for practicing spinal procedures, such as lumbar nerve root sleeve, radiculography, lumbar facet infiltrations, ligamentary infiltration on the sacroiliac joint, lumbar epidural pain therapy, epidural-sacral epidural-dorsal, or epidural perineural injections. In some embodiments, the different segments of the spine may be of a different color or density. The camera 120 may detect the angle of the spinal injections, which is particularly important in identifying successful spinal procedures.

Figure 27:
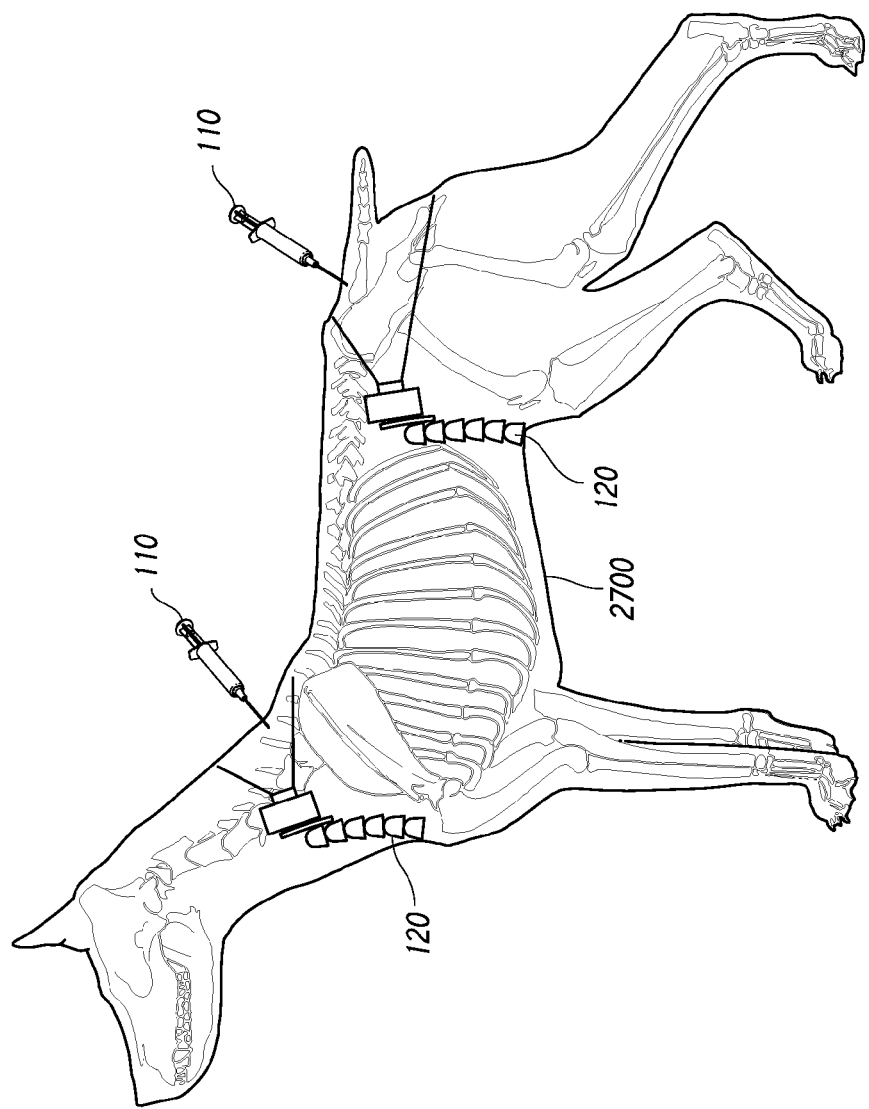
FIG. 27 illustrates an injection apparatus for injection training with the anatomy of a dog displayed.

FIG. 27 illustrates an injection apparatus for injection training with the anatomy of a dog 2700 displayed. The injection apparatus may simulate the entire body of an animal or only a specific section of the body or any internal organs. Cameras 120 may be placed within the injection apparatus at different locations of the dog body 2700. The training apparatus may be used to practice inserting intravenous, central line, or arterial catheters into the dog 2600. Injectors may also use the training apparatus for performing procedures on extracting fluids from internal organs. For example, the injector may practice cystocentesis, abdominocentesis, pericardiocentesis, thoracentesis, or myelograms.

In some embodiments, the veins of a dog 2700 may have a different color or density than the other portions of the injection apparatus. This is particularly helpful for injectors who wish to practice intravenous injections. For example, injectors who want to practice euthanasia procedures may be given a solution that has the same viscosity of pentobarbital or phenytoin, which are commonly used by veterinarian in administering euthanasia procedures.

Figure 28:
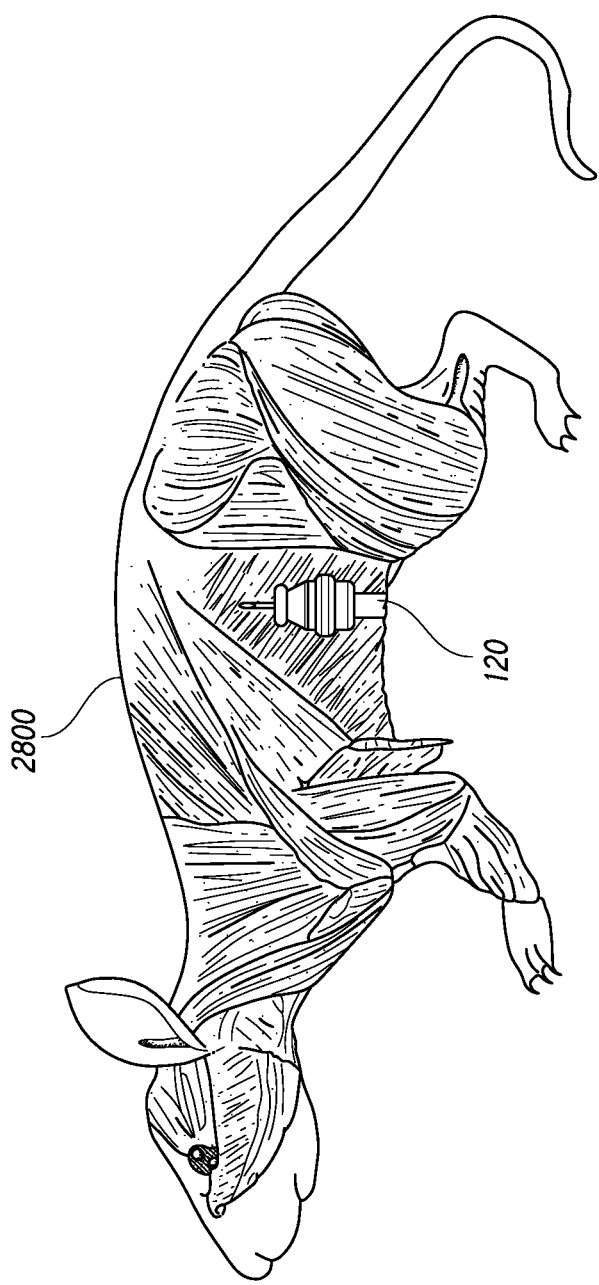
FIG. 28 illustrates an injection apparatus for injection training with the anatomy of a rat displayed.

FIG. 28 depicts an injection apparatus for injection training with the anatomy of a rat 2800 displayed. For smaller injection apparatuses, an endoscope may be used as the camera 120. The different organs or sections of the rat 2800 may be color coded or be of a different density. In some embodiments, portions of the rat may be surgically removed for procedures to simulate a biopsy.

The term "injection" as used herein includes it usual and customary meaning of an injection, but is also to be interpreted broad enough to encompass, for example, the insertion of a catheter device or the use of simple needles, such as would be used in an acupuncture therapy. The techniques involved, particularly a camera embedded in a model of a living subject and a tool with a light emitter can be applied to any therapeutic procedure. For example, the tool can be a catheter and the procedure can be a minimally invasive procedure requiring the catheter to be located in a particular location.

TERMINOLOGY/ADDITIONAL EMBODIMENTS

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such embodiment decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

What is claimed is:

1. A testing tool system comprising:
   a needle;
   a barrel cooperating with a proximal portion of the needle:
   a light source configured to emit a plurality of different intensities of light:
   and
   an optical fiber located inside a central portion of the needle and configured to receive the light emitted from the light source and transmit the light through the needle from the proximal portion of the needle near the barrel to a distal portion of the needle near a tip of the needle so that the light is emitted from the tip of the needle.

2. The testing tool system of claim 1, further comprising a plunger.

3. The testing tool system of claim 2, further comprising a sensor configured to determine a relative position of the plunger with respect to the barrel.

4. The testing tool system of claim 3, wherein the sensor is a potentiometer.

5. The testing tool of system claim 2, further comprising a friction system configured to simulate an injection.

6. The testing tool system of claim 1, wherein the needle is hollow.

7. The testing tool system of claim 1, wherein the light source is located outside of the barrel.

8. The testing tool system of claim 1, wherein the emitted light is one or more of visible light, non-visible light, ultraviolet light, polarized light, infrared light or fluorescent light.

9. The testing tool system of claim 1, further comprising a transmitter configured to transmit a plurality of injection parameters from the testing tool for an injection.

10. The testing tool system of claim 9, wherein the plurality of injection parameters include one or more of: depth, angle, speed, friction, and pressure of the injection.

11. The testing tool system of claim 9, further comprising a processor in data communication with the transmitter and configured to determine a rating of the injection based on the plurality of injection parameters.

12. The testing tool system of claim 11, wherein the rating includes at least one of: an accuracy of injections, an experience of an injector performing the injection, a quality of the injector.

13. The testing tool system of claim 11, wherein the rating includes one or more of education, years of experience, performance results with the injection apparatus, or patient reviews.

14. A testing tool comprising:
    a hypodermic needle comprising a hollow opening extending through a central portion of the hypodermic needle from a proximal end of the hypodermic needle to a distal end of the hypodermic needle, the distal end being near a head of the hypodermic needle; and
    an optical fiber extending through the hollow portion of the hypodermic needle, the optical fiber configured to receive emitted light from a light source through a proximate end of the optical fiber, the optical fiber further configured to emit light out of a distal end of the optical fiber, the optical fiber positioned in the needle so that light is emitted from a central point at the head of the hypodermic needle.

15. The testing tool of claim 14, wherein the light source is located remotely from the hypodermic needle.

16. The testing tool of claim 14, wherein the distal end of the optical fiber is located at a tip of the needle.

17. The testing tool of claim 14, wherein the emitted light is one or more of visible light, non-visible light, ultraviolet light, infrared light or fluorescent light.

18. The testing tool of claim 14, further comprising a syringe.

19. The testing tool of claim 14, further comprising a barrel and plunger.

20. The testing tool of claim 19, further comprising a sensor configured to determine a relative position of the plunger with respect to the barrel.

21. The testing tool of claim 20, wherein the sensor is potentiometer.

22. The testing tool of claim 14, further comprising a transmitter configured to transmit a plurality of injection parameters from the testing tool for an injection.

23. The testing tool of claim 22, wherein the plurality of injection parameters include one or more of: depth, angle, speed, friction, and pressure of the injection.

24. The testing tool of claim 14, wherein the needle is hollow.

25. The testing tool of claim 24, wherein the central point is located within the hollow.

* * * * *

UNITED STATES PATENT AND TRADEMARK OFFICE
CERTIFICATE OF CORRECTION

Page 1 of 1

PATENT NO. : 8,961,189 B2
APPLICATION NO. : 14/318368
DATED : February 24, 2015
INVENTOR(S) : Gabrielle A. Rios It is certified that error appears in the above-identified patent and that said Letters Patent is hereby corrected as shown below:

In The Drawings

Sheet 28 of 32 (FIG. 24) at lines 5-6 (approx.), Change "OCCIPTAL LOBE" to --OCCIPITAL LOBE--.

In The Specification

In column 23 at line 18, Change "/bucal" to --/buccal--.

In The Claims

In column 29 at line 22, In Claim 5, after "system" insert --of--.

Signed and Sealed this
Fifth Day of January, 2016

Michelle K. Lee
*Director of the United States Patent and Trademark Office*